(12) United States Patent
Ushiki et al.

(10) Patent No.: US 9,277,207 B2
(45) Date of Patent: Mar. 1, 2016

(54) IMAGE PROCESSING APPARATUS, IMAGE PROCESSING METHOD, AND PROGRAM FOR GENERATING MULTI-VIEW POINT IMAGE

(75) Inventors: Suguru Ushiki, Tokyo (JP); Masami Ogata, Kanagawa (JP)

(73) Assignee: Sony Corporation, Tokyo (JP)

( * ) Notice: Subject to any disclaimer, the term of this patent is extended or adjusted under 35 U.S.C. 154(b) by 747 days.

(21) Appl. No.: 13/563,201

(22) Filed: Jul. 31, 2012

(65) Prior Publication Data

US 2013/0038606 A1 Feb. 14, 2013

(30) Foreign Application Priority Data

Aug. 8, 2011 (JP) ................................ 2011-173268

(51) Int. Cl.
*H04N 13/04* (2006.01)
*H04N 13/00* (2006.01)

(52) U.S. Cl.
CPC ....... *H04N 13/0404* (2013.01); *H04N 13/0011* (2013.01); *H04N 13/0022* (2013.01); *H04N 13/0409* (2013.01); *H04N 13/0447* (2013.01)

(58) Field of Classification Search
None
See application file for complete search history.

(56) References Cited

U.S. PATENT DOCUMENTS

| 6,163,337 | A   | * | 12/2000 | Azuma et al. ................. 348/43  |
|-----------|-----|---|---------|---------------------------------------|
| 6,269,175 | B1  | * | 7/2001  | Hanna et al. ................. 382/107 |
| 2005/0129325 | A1 | * | 6/2005 | Wu .............................. 382/254 |
| 2006/0170674 | A1 | * | 8/2006 | Tsubaki et al. ............... 345/419 |
| 2008/0112616 | A1 | * | 5/2008 | Koo et al. ..................... 382/171 |
| 2011/0109720 | A1 | * | 5/2011 | Smolic et al. .................. 348/43 |
| 2011/0128353 | A1 | * | 6/2011 | Leung et al. ................... 348/47 |
| 2011/0157319 | A1 | * | 6/2011 | Mashitani et al. ............. 348/49 |

FOREIGN PATENT DOCUMENTS

| JP | 09-121370 | 5/1997 |
| JP | 2006-115198 | 4/2006 |

* cited by examiner

*Primary Examiner* — Mark Zimmerman
*Assistant Examiner* — Jonathan M Cofino
(74) *Attorney, Agent, or Firm* — Paratus Law Group, PLLC

(57) ABSTRACT

There is provided an image processing apparatus including a left eye image input unit configured to input a left eye image (L image) which is a left eye image signal applied to three-dimensional image display, a right eye image input unit configured to input a right eye image (R image) which is a right eye image signal applied to three-dimensional image display, a parallax information generating unit configured to generate parallax information from the left eye image (L image) and the right eye image (R image), and a virtual view point image generating unit configured to receive the left eye image (L image), the right eye image (R image), and the parallax information, and generate virtual view point images including a view point image other than view points of the received LR images.

10 Claims, 28 Drawing Sheets

FIG. 4
EXAMPLE OF OBSERVATION IMAGE
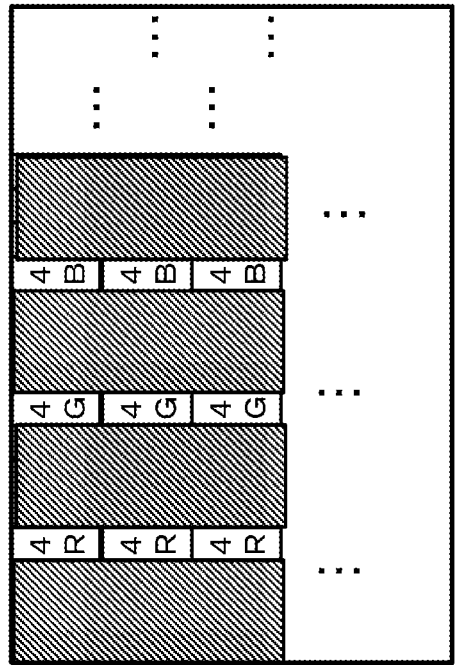
(c1) LEFT EYE VIEW POINT IMAGE
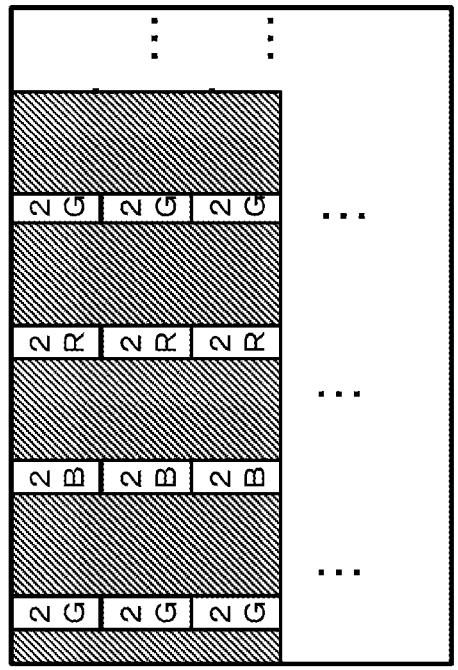
(c2) RIGHT EYE VIEW POINT IMAGE FIG. 18
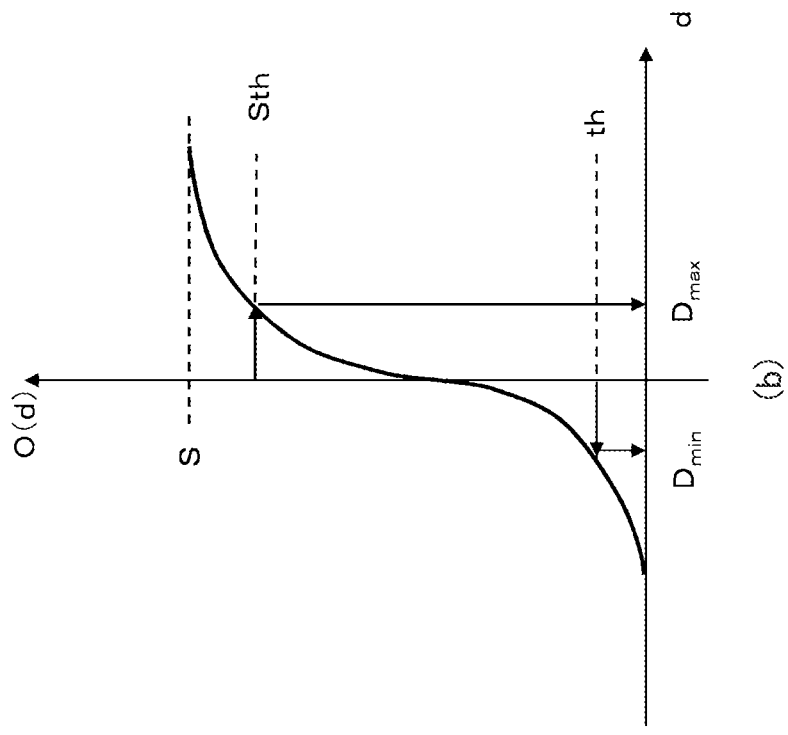
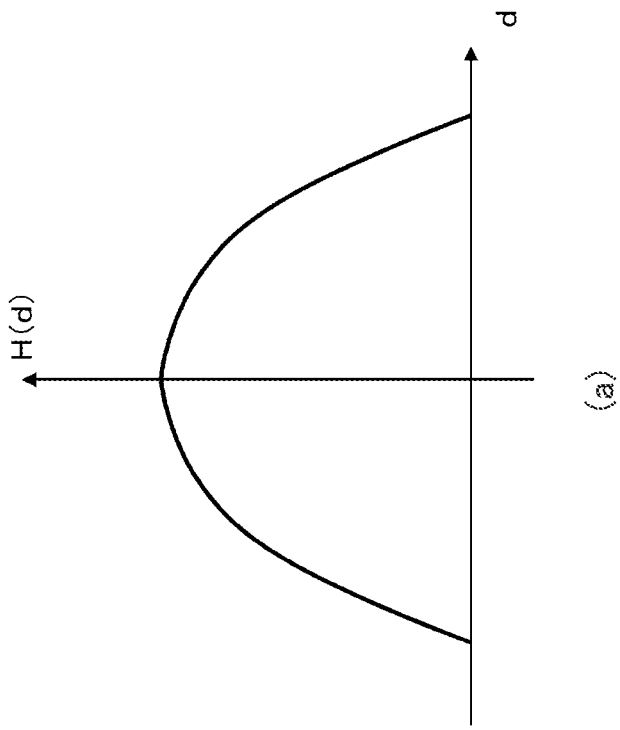

FIG. 23
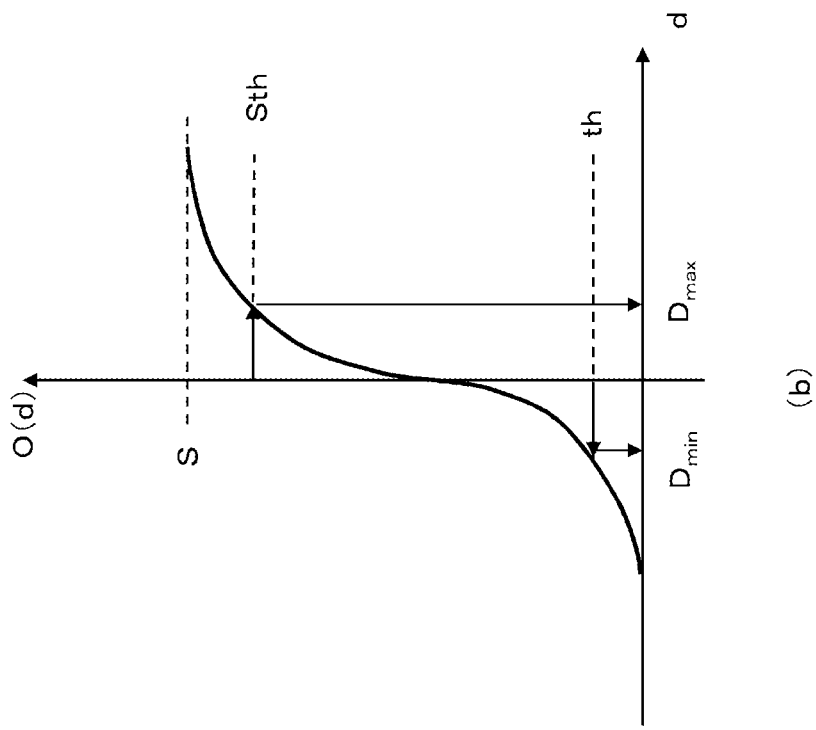
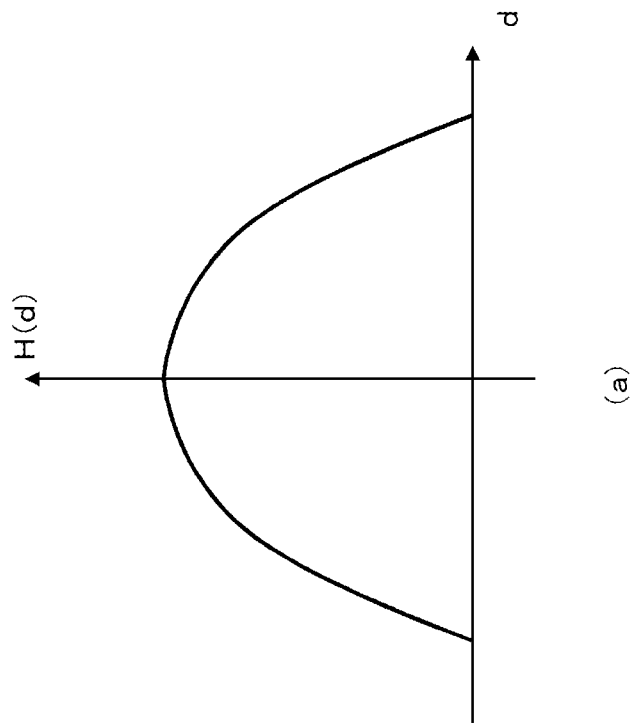

IMAGE PROCESSING APPARATUS, IMAGE PROCESSING METHOD, AND PROGRAM FOR GENERATING MULTI-VIEW POINT IMAGE

BACKGROUND

The present disclosure relates to an image processing apparatus, an image processing method, and a program, and more particularly, to an image processing apparatus, an image processing method, and a program for generating a multi-view point image which is applied to three-dimensional (3D) image display.

A naked eye-type 3D display apparatus has been put into practice. The naked eye-type 3D display apparatus allows a user to perceive a stereoscopic image without wearing glasses in three-dimensional (3D) image display processing. The naked eye 3D display apparatus includes, for example, a lenticular sheet or a parallax barrier (parallax barrier) on a display surface, which controls images entering into the left eye and the right eye in accordance with a viewing/listening position.

With such method, however, a correct stereoscopic vision can be obtained only at a limited viewing/listening position with respect to a display. Therefore, when a user's observation position is located at a position different from a specified position, reversed vision and crosstalk occurs. In the reversed vision, a right eye image enters into the left eye, and a left eye image enters into the right eye. In the crosstalk, a left eye image and a right eye image are mixed.

In order to solve this problem, a configuration has been suggested to generate and display not only a standard left eye image and a standard right eye image corresponding to a regular observation position but also an image from a new view point which is configured not to produce any crosstalk when observed from other observation positions.

Not only an original set of a left eye image and a right eye image but also images of other virtual view points are generated as multi-view point images, and an appropriate set of a left eye image and a right eye image according to a user's observation position is selectable from these multi-view point images, in accordance with the observation position, whereby images are displayed while reducing the reversed vision and the crosstalk.

In other words, this allows a user to observe a different pair of a left eye image and a right eye image in accordance with the user's observation position, so that even when the user's observation position is changed, this allows the left eye and the right eye of the observer to observe a left eye image and a right eye image according to each observation position.

More specifically, based on the original images for two view points which are input to a display apparatus or an image processing apparatus, i.e., two view point images including a left eye image (L image) and a right eye image (R image) for 3D image display, view point images for virtual view points are generated in addition to these two view points. For example, multi-view point images for ten different view points including the original LR images are generated.

A user observes a combination of appropriate two images among the generated multi-view point images in accordance with a user's observation position with respect to the display, whereby 3D images can be displayed and can be observed while reducing crosstalk in which a left eye image and a right eye image are mixed, at various observation positions.

For example, Japanese Patent Application Laid-Open No. 2006-115198 discloses a method for inputting an original left eye image (L image) and an original right eye image (R image), executing parallax detection from these two images, and generating images for multiple virtual view points, on the basis of the detected parallax information. More specifically, parallax is detected from the two received original 3D images including the left eye image (L image) and the right eye image (R image), and determining virtual view point positions different from the received LR images, on the basis of the amount of crosstalk and the fusional parallax range.

In the processing described in this Japanese Patent Application Laid-Open No. 2006-115198, however, the quality of the generated virtual view point images is not taken into consideration, and the processing described in this Japanese Patent Application Laid-Open No. 2006-115198 is configured to determine the virtual view point positions using the center of the left eye image and the right eye image as a reference. Therefore, the quality of the generated virtual view point images is reduced, and an image which can be hardly observed may be displayed.

There is a close relationship between the virtual view point position and the image quality.

For example, where the view point position of the received L image is 0.0, and the view point position of the received R image is 1.0, the relationship between an image for a newly generated virtual view point and its image quality has the following features.

(Feature 1) At a virtual view point position between 0.0 and 1.0, i.e., between the L image (0.0) and the R image (1.0), a virtual view point image of 0.5 which is the central position of the LR images has the lowest image quality as compared with other virtual view point positions.

(Feature 2) At a virtual view point position which is equal to or less than 0.0 and equal to or more than 1.0 at the left side of the L image or at the right side of the R image, the farther the position is away from the L image or the R image, the lower the quality of video becomes.

Such relationship between the virtual view point position and the image quality results from, for example, the precision of the parallax detection and the amount of occlusion region included in the image.

It should be noted that when the view point position of 0.0, the original received left eye image can be used as it is, and at the view point position of 1.0, the original received right eye image can be used as it is. Therefore, at these positions, the image quality becomes the highest.

Japanese Patent Application Laid-Open No. 2006-115198 suggests a method for detecting the maximum amount of parallax from 3D images of an original received left eye image (L image) and an original received right eye image (R image) and determining virtual view point positions so that the maximum parallax is accommodated within the amount of crosstalk and the fusional parallax range. In other words, this discloses a method for determining a view point interval of virtual view point image generated according to the maximum amount of parallax of the received LR images.

However, when the maximum parallax is detected from the original LR images, an image in an image region having the maximum parallax and likelihood an image region attracts attention are not taken into consideration. Therefore, for example, the following problems occur.

During the maximum parallax detection, the size of area of the image region having the maximum parallax is not taken into consideration. Therefore, when an object having a small size of area has the maximum parallax, the virtual view point interval may be reduced more than necessary, in accordance with the existence of the maximum parallax image region that hardly affects the visual appearance.

In addition, the likelihood of getting attraction to the image region having the maximum parallax is not taken into consideration during the maximum parallax detection. Therefore, when an image region that hardly attracts attention in terms of visual appearance has the maximum parallax, the virtual view point interval may be reduced or increased more than necessary, in accordance with the maximum parallax information of the image region that hardly affects the visual appearance.

Japanese Patent Application Laid-Open No. H9-121370 discloses a method using an original received left eye image (L image) and an original received right eye image (R image) to maintain parallax within a fusional range by moving these images in parallel (shifting).

By generating virtual view point images by means of shift processing disclosed in Japanese Patent Application Laid-Open No. H9-121370, the offset of the parallax distribution can be adjusted, i.e., the offset adjustment can be done to move an too-deep image to the viewer's side as a whole. However, since the extension of the parallax distribution may not be adjusted, the following glitches may occur: the entire image may shift too much to the viewer's side or may move too much to the deeper side as a result of the offset adjustment.

SUMMARY

The present disclosure is to solve, for example, the above problems, and provides an image processing apparatus, an image processing method, and a program having a configuration of performing generating processing of multi-view point images based on a left eye image (L image) and a right eye image (R image) for 3D image, wherein the multi-view point images are generated upon determining virtual view point positions in view of, for example, an image quality, an appropriate amount of parallax, or a region of an image which is likely to attract attention.

According to a first embodiment of the present disclosure, there is provided an image processing apparatus including a left eye image input unit configured to input a left eye image (L image) which is a left eye image signal applied to three-dimensional image display, a right eye image input unit configured to input a right eye image (R image) which is a right eye image signal applied to three-dimensional image display, a parallax information generating unit configured to generate parallax information from the left eye image (L image) and the right eye image (R image), and a virtual view point image generating unit configured to receive the left eye image (L image), the right eye image (R image), and the parallax information, and generate virtual view point images including a view point image other than view points of the received LR images. The virtual view point image generating unit determines virtual view point positions by means of processing in view of at least one of image qualities of virtual view point images, an appropriate amount of parallax, or an image weight according to an image region, and generates the virtual view point images corresponding to the determined virtual view point positions.

The virtual view point image generating unit calculates an image quality evaluation value Q indicating an image quality of a virtual view point image, calculates a virtual view point interval G by applying the calculated image quality evaluation value Q, and determines the virtual view point position on the basis of the calculated virtual view point interval G.

The virtual view point image generating unit calculates the image quality evaluation value Q by applying information of at least one of reliability degree information of the parallax information or the generated virtual view point image information.

The virtual view point image generating unit calculates, as an appropriate amount of parallax, a smaller value of a fusional parallax amount and a crosstalk allowable amount, calculates a virtual view point interval G by applying the calculated appropriate amount of parallax, and determines the virtual view point position on the basis of the calculated virtual view point interval G.

The virtual view point image generating unit calculates, as an appropriate amount of parallax, a smaller value of a fusional parallax amount and a crosstalk allowable amount, calculates a virtual view point interval G by applying the calculated appropriate amount of parallax, and determines the virtual view point position on the basis of the calculated virtual view point interval G.

The image processing apparatus includes a weight information generating unit configured to calculate image weight information according to an image region. The virtual view point image generating unit calculates a weighted parallax distribution obtained by correcting the parallax information by applying the image weight information, calculates a virtual view point interval G by applying the appropriate amount of parallax and a maximum value of parallax calculated from the calculated weighted parallax distribution, and determines the virtual view point position on the basis of the calculated virtual view point interval G.

The weight information generating unit generates image weight information in which a weight in unit of image region is set according to a position of an image or image weight information according to a subject included in an image.

The virtual view point image generating unit determines a first virtual view point position by means of processing in view of at least one of an image quality of a virtual view point image, an appropriate amount of parallax, or an image weight according to an image region, determines a second virtual view point position of non-regular interval by means of non-linear mapping processing performed on the determined first virtual view point position, and generates a virtual view point image corresponding to the determined second virtual view point position of the non-regular interval.

The virtual view point image generating unit determines the virtual view point position by means of processing in view of at least one of an image quality of the virtual view point image, an appropriate amount of parallax, or an image weight according to an image region, calculates an amount of parallel movement on the basis of parallax distribution data calculated from the parallax information, executes moving processing of the parallax distribution between the virtual view point images of the respective virtual view point positions on the basis of the calculated amount of parallel movement, and generates virtual view point images reflecting a moving processing result of the parallax distribution data.

According to the second embodiment of the present disclosure, there is provided an image-capturing apparatus including an image-capturing unit configured to capture a left eye image (L image) which is a left eye image signal and a right eye image (R image) which is a right eye image signal, which are applied to three-dimensional image display, a left eye image input unit configured to input, from the image-capturing unit, the left eye image (L image) which is the left eye image signal applied to the three-dimensional image display, a right eye image input unit configured to input, from the image-capturing unit, the right eye image (R image) which is the right eye image signal applied to the three-dimensional image display, a parallax information generating unit configured to generate parallax information from the left eye image (L image) and the right eye image (R image), and a virtual view point image generating unit configured to receive the left eye image (L image), the right eye image (R image), and the parallax information, and generate virtual view point images including a view point image other than view points of the received LR images. The virtual view point image generating unit determines virtual view point positions by means of processing in view of at least one of image qualities of virtual view point images, an appropriate amount of parallax, or an image weight according to an image region, and generates the virtual view point images corresponding to the determined virtual view point positions.

According to the third embodiment of the present disclosure, there is provided an image processing method with which an image processing apparatus generates multi-view point images, the image processing method including inputting, by a left eye image input unit, a left eye image (L image) which is a left eye image signal applied to three-dimensional image display, inputting, by a right eye image input unit, a right eye image (R image) which is a right eye image signal applied to three-dimensional image display, generating, by a parallax information generating unit, parallax information from the left eye image (L image) and the right eye image (R image), and receiving, by a virtual view point image generating unit, the left eye image (L image), the right eye image (R image), and the parallax information, and generating virtual view point images including a view point image other than view points of the received LR images. In the virtual view point image generating step, virtual view point positions are determined by means of processing in view of at least one of image qualities of virtual view point images, an appropriate amount of parallax, or an image weight according to an image region, and the virtual view point images corresponding to the determined virtual view point positions are generated.

According to the fourth embodiment of the present disclosure, there is provided a program for causing an image processing apparatus to generate multi-view point images, the program including causing a left eye image input unit to input a left eye image (L image) which is a left eye image signal applied to three-dimensional image display, causing a right eye image input unit to input a right eye image (R image) which is a right eye image signal applied to three-dimensional image display, causing a parallax information generating unit to generate parallax information from the left eye image (L image) and the right eye image (R image); and causing a virtual view point image generating unit to receive the left eye image (L image), the right eye image (R image), and the parallax information, and generate virtual view point images including a view point image other than view points of the received LR images. In the virtual view point image generating step, virtual view point positions are determined by means of processing in view of at least one of image qualities of virtual view point images, an appropriate amount of parallax, or an image weight according to an image region, and the virtual view point images corresponding to the determined virtual view point positions are generated.

It should be noted that the program according to an embodiment of the present disclosure is, for example, a program that can be provided by a storage medium or a communication medium provided in a computer-readable format to a general purpose system that can execute various program codes. By providing such programs in the computer-readable format, processing according to the programs is achieved on a computer system.

Other objects, features, and advantages of the present disclosure will become apparent from more detailed description based on attached drawings and embodiments of the present disclosure explained below. In this specification, a system is a logical configuration of a set of multiple apparatuses, and an apparatus of each configuration is not necessarily limited to be provided within the same housing.

According to a configuration of an embodiment of the present disclosure, a configuration for generating multi-view point images based on LR images of three-dimensional images is achieved.

More specifically, for example, a virtual view point image generating unit is provided, wherein the virtual view point image generating unit receives a left eye image (L image) and a right eye image (R image) which are applied to three-dimensional image display, generates parallax information on the basis of the left eye image (L image) and the right eye image (R image), and uses the LR image and the parallax information to generate virtual view point images including view point images other than the view points of the received LR images. The virtual view point image generating unit determines the virtual view point positions by means of processing in view of at least one of an image quality of a virtual view point image, an appropriate amount of parallax determined in view of a fusional parallax amount and a crosstalk allowable amount, and an image weight according to an image region of a subject and the like and a position of an image, and generates virtual view point images corresponding to the determined virtual view point positions.

With such processing, optimum virtual view point images according to respective observation positions, i.e., high-quality virtual view point images of comfortable parallax ranges, can be generated.

BRIEF DESCRIPTION OF THE DRAWINGS

FIG. 4 is a figure explaining an example of display processing of multi-view point images;

FIGS. 18A and 18B are figures for explaining relationship data of a parallax d and a weighted parallax distribution H(d) and relationship data of parallax d and parallax accumulative distribution O(d);

FIG. 23 is a figure for explaining relationship data of a parallax d and a weighted parallax distribution H(d) and relationship data of parallax d and parallax accumulative distribution O(d);

DETAILED DESCRIPTION OF THE EMBODIMENTS

Figure 1:
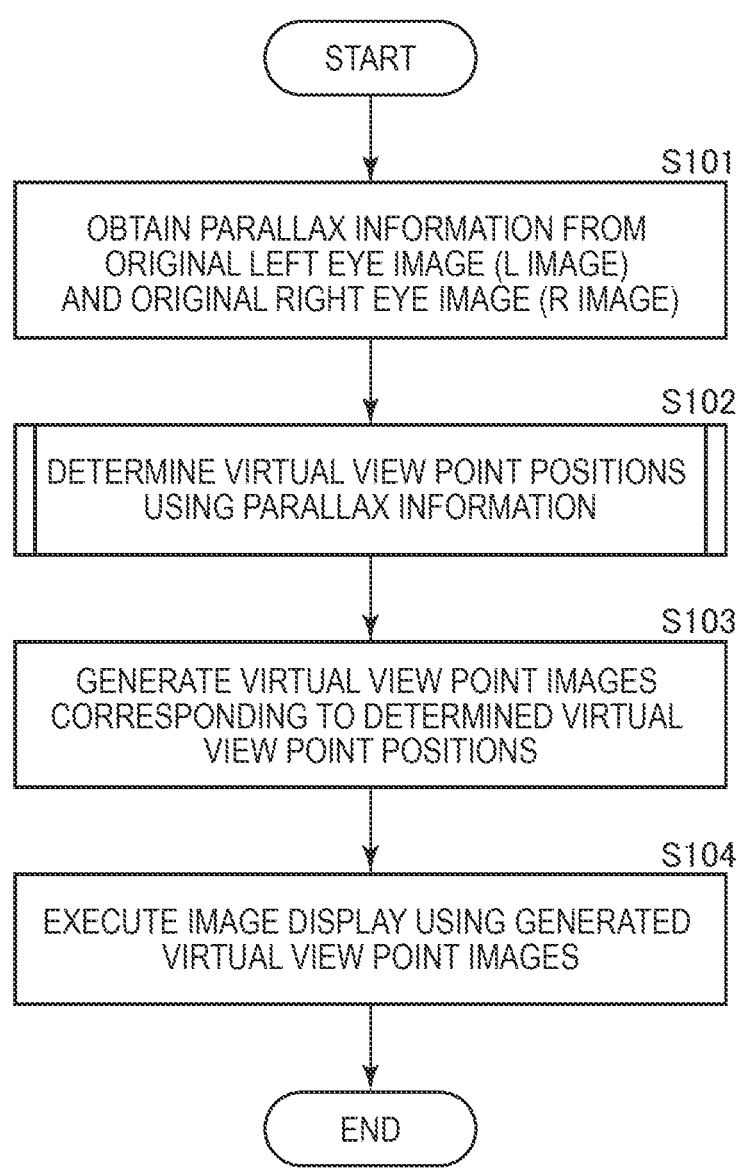
FIG. 1 is a figure illustrating a flowchart explaining a processing sequence executed by an image processing apparatus.

Embodiments of an image processing apparatus, an image processing method, and a program according to an embodiment of the present disclosure will be explained in detail with reference to drawings. Explanation will be made according to the following items.

1. (First Embodiment) Embodiment in which determining processing of virtual view point positions is executed in view of image quality
 1-1. Overall processing sequence of processing executed by image processing apparatus
 1-2. Determining processing of virtual view point positions according to first embodiment
2. (Second Embodiment) Embodiment in which determining processing of virtual view point positions is executed on the basis of appropriate amount of parallax and image weight
3. (Third Embodiment) Embodiment in which determining processing of virtual view point positions is executed on the basis of image quality, appropriate amount of parallax, and image weight
4. (Fourth Embodiment) Example of processing for determining virtual view point positions of non-regular intervals
5. (Fifth Embodiment) Example of processing for generating virtual view point images using shift processing
6. Example of Configuration of Image Processing Apparatus
7. Summary of Configuration of the Present Disclosure 1. First Embodiment Embodiment in which Determining Processing of Virtual View Point Positions is Executed in View of Image Quality First, an embodiment in which determining processing of virtual view point positions is executed in view of image quality will be explained as the first embodiment of an image processing apparatus of the present disclosure.

[1-1. Overall Processing Sequence of Processing Executed by Image Processing Apparatus]

FIG. 1 is a flowchart explaining an overall processing sequence of processing executed by an image processing apparatus according to the present embodiment.

First, overall processing sequence of processing executed by the image processing apparatus according to the present embodiment will be explained with reference to the flow of FIG. 1, and thereafter, details of processing of each step will be explained in order.

In step S101, the image processing apparatus receives an original left eye image (L image) and an original right eye image (R image) for three-dimensional image display, and obtains parallax information using these received LR images.

In other words, parallax information is obtained by using standard LR images with which an optimum three-dimensional image is observed when observed from a standard visual position with respect to a display displaying a three-dimensional (3D) image.

The parallax information corresponds to a displacement between images of the same subject included in standard LR images (pixel displacement in a horizontal direction), and is information corresponding to a distance of a subject. More specifically, for example, data having parallax information (subject distance information) in units of pixels are generated.

In step S102, virtual view point positions of multi-view point images to be generated are determined on the basis of the parallax information obtained in step S101.

The standard LR images have a certain range of parallax from a large parallax to a small parallax. In step S102, the virtual view point positions of the multi-view point images to be generated are determined on the basis of this parallax distribution information, and the like.

In step S103, the multi-view point images including the virtual view point images corresponding to the virtual view point positions determined in step S102 are generated.

The virtual view point images are generated using the received standard LR images.

Finally, in step S104, image display processing is executed using the virtual view point images generated in step S103.

As described above, the received LR images can be observed as an optimum three-dimensional image when it is observed from a standard observation position, but when the standard LR images are observed when the observation position is displaced from the standard position, reversed vision or crosstalk occurs.

However, the reversed vision and the crosstalk can be prevented by allowing the observer's left eye and right eye to observe two LR images selected from the multi-view point images generated according to this processing, in accordance with the observation position.

In step S104, this kind of image display is executed.

Subsequently, the details of processing of each step in the flowchart as illustrated in FIG. 1 will be explained.

(Step S101: Acquisition of Parallax Information)

First, acquisition processing of the parallax information in step S101 will be explained.

In step S101, an original left eye image (L image) and an original right eye image (R image) for three-dimensional image display are received, and parallax information is obtained using these received LR images. As described above, the parallax information corresponds to a displacement between images of the same subject included in standard LR images (pixel displacement in a horizontal direction), and is information corresponding to a distance of a subject. More specifically, for example, data having parallax information (subject distance information) in units of pixels are generated.

This acquisition of the parallax information is executed according to, for example, an existing method as follows.

(a) block matching-based parallax information acquisition processing (b) DP (dynamic programming) matching-based parallax information acquisition processing (c) segmentation-based parallax information acquisition processing (d) learning-based parallax information acquisition processing (e) Parallax information acquisition processing of a combination of the above methods For example, the parallax information is obtained according to any one of the above methods (a) to (e).

The block matching-based parallax information acquisition processing will be briefly explained.

In the received original left eye image (L image) the received original right eye image (R image), for example, a pixel region (block) of the L image is selected, and a block similar to the selected block is detected from the R image. In other words, blocks (matching blocks) determined to be regions obtained by shooting the same subject are selected from the LR images. Further, position displacement of the matching blocks between the LR images (the number of pixels in the horizontal direction and the like) is measured.

The position displacement of the blocks is different according to the distance of the subject taken in that block.

In other words, the position displacement of the blocks corresponds to the subject distance, and this position displacement information is obtained as the parallax information.

It should be noted that an example of form of expression of this parallax information includes a depth map (distance image). The depth map is an image which expresses, for example, parallax between the L image and the R image in units of pixels (subject distance) as brightness in units of pixels. In the depth map, for example, a bright region indicates a close subject (close to a camera), and a dark region indicates a far subject (far from the camera). In other words, the depth map is an image in which the subject distance is represented as the brightness.

In step S101, for example, this kind of depth map is generated as the parallax information.

(Step S102: Determination of Virtual View Point Positions)

The determining processing of the virtual view point positions in step S102 will be explained in detail later.

(Step S103: Generation of Virtual View Point Image)

Subsequently, the generating processing of the virtual view point images in step S103 will be explained.

In step S103, images corresponding to images observed from the virtual view point positions determined in step S102 are generated. In other words, the virtual view point images are generated. In step S102, for example, a predetermined number of (for example, 10) virtual view points are determined, and in step S103, virtual view point images corresponding to the virtual view points are generated.

The virtual view point images are generated using the received standard LR images. In other words, they are generated using the original left eye image (L image) and the original right eye image (R image) for three-dimensional image display.

Specific example of generating processing of virtual view point images will be explained with reference to FIG. 2.

Figure 2:
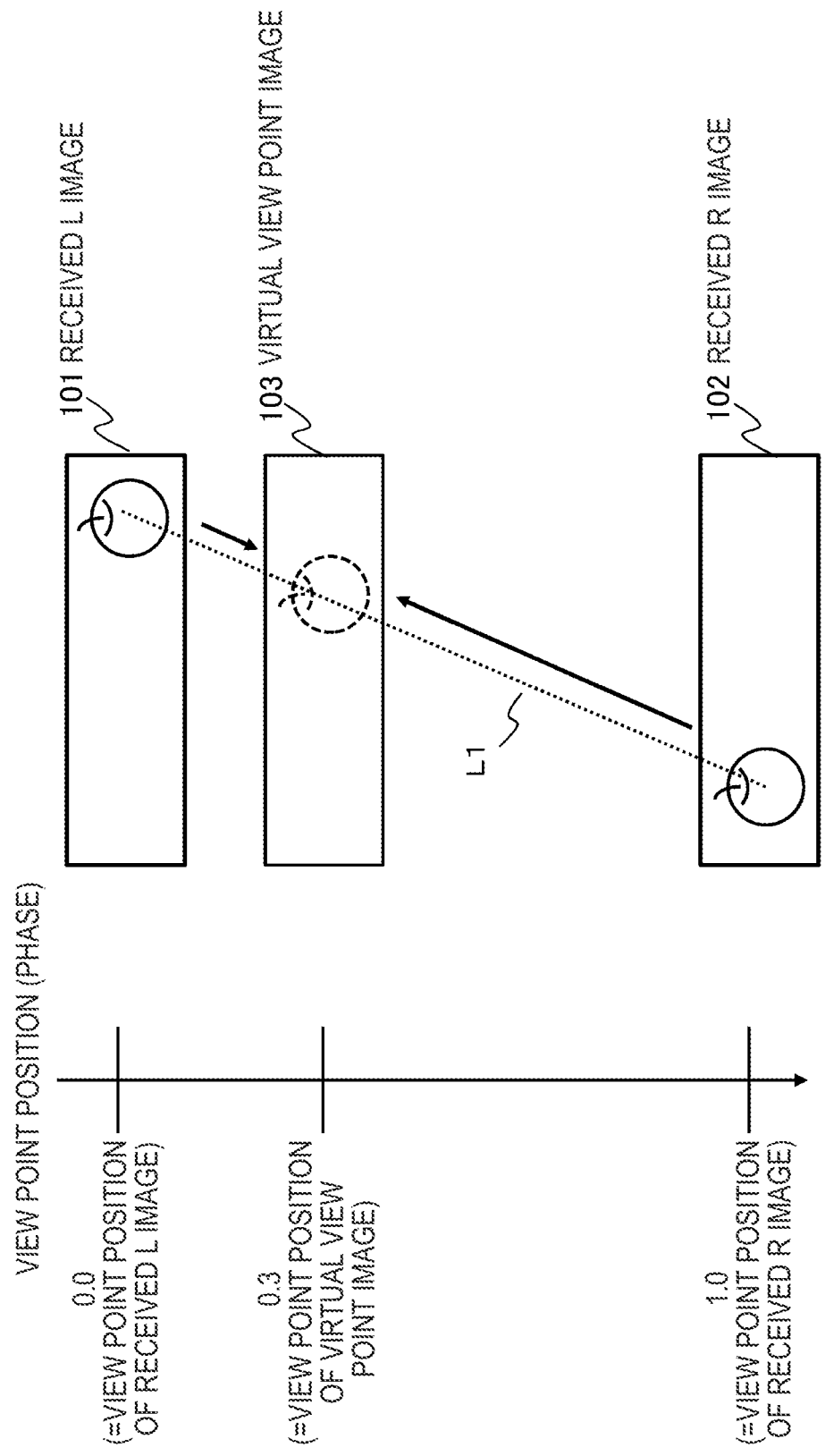
FIG. 2 is a figure explaining an example of generating processing of virtual view point images.

FIG. 2 shows an original left eye image (L image) 101 and an original right eye image (R image) 102 which are received by the image processing apparatus, and also shows a virtual view point image 103 generated based on these LR images.

The left eye image (L image) 101 is an image observed from the left eye view point position at the standard position, and the right eye image (R image) 102 is an image observed from the right eye view point position at the standard position.

The view point position of the left eye image (L image) 101 is defined as 0.0, and the view point position of the right eye image (R image) 102 is defined as 1.0.

FIG. 2 illustrates an example of processing where, for example, an observation image from a view point position of 0.3, which is between view point positions of 0.0 to 1.0, is generated as a virtual view point image 103.

In the left eye image (L image) 101 and the right eye image (R image) 102, the same subject (apple) is taken at respectively different positions. In the L image and the R image, the positions of the same subject are at different positions because their view point positions are different.

When the virtual view point image 103 observed from the view point position of 0.3, which is between the view point positions of 0.0 to 1.0, is generated, the position of this subject (apple) is set by linear interpolation. By changing the subject position along line L1 as illustrated in FIG. 2, the virtual view point images can be generated by determining the subject positions of the virtual view point images at the respective virtual view points.

As described above, the virtual view point images at the virtual view point positions are generated by linear interpolation processing based on the received LR images.

When a virtual view point image is generated, the virtual view point image can be generated by processing of blending the two images using both of the received LR images.

Alternatively, a virtual view point image can be generated using only one image by means of processing of displacing the subject position according to the virtual view point position using only the L image or only the R image.

Alternatively, processing may be performed as follows. At a virtual view point position close to the L image side, a virtual view point image may be generated using only the L image. At a virtual view point position close to the R image side, a virtual view point image may be generated using only the R image.

(S104: Image Display Processing)

Subsequently, the processing of step S104, i.e., the details of the image display processing using the virtual view point images generated in step S103, will be explained with reference to FIG. 3.

A display image generated by an image processing apparatus according to an embodiment of the present disclosure is a display image of a naked eye 3D display apparatus, with which a user can view a stereoscopic image without wearing glasses.

The naked eye 3D display apparatus includes a lenticular sheet or a parallax barrier (parallax barrier) on a display surface, which controls images entering into the left eye and the right eye in accordance with a viewing/listening position. In other words, this has such configuration that a left eye image and a right eye image are generated, and the left eye image is allowed to be observed with only the left eye, and the right eye image is allowed to be observed with only the right eye.

Using this kind of technique, crosstalk in which images entering into the left eye and the right eye are mixed is reduced, and this enables stereoscopic vision without wearing glasses.

As a result of generation of the virtual view point images in step S103, the multi-view point images made of multiple view points (for example, N view points) including the received LR images are generated.

These N images are displayed on the naked eye 3D display apparatus, and in accordance with the observation position of the observer, different combinations of view point images are respectively perceived by the left eye and the right eye of the observer, so that the optimum 3D image display is executed according to the observation position.

Figure 3:
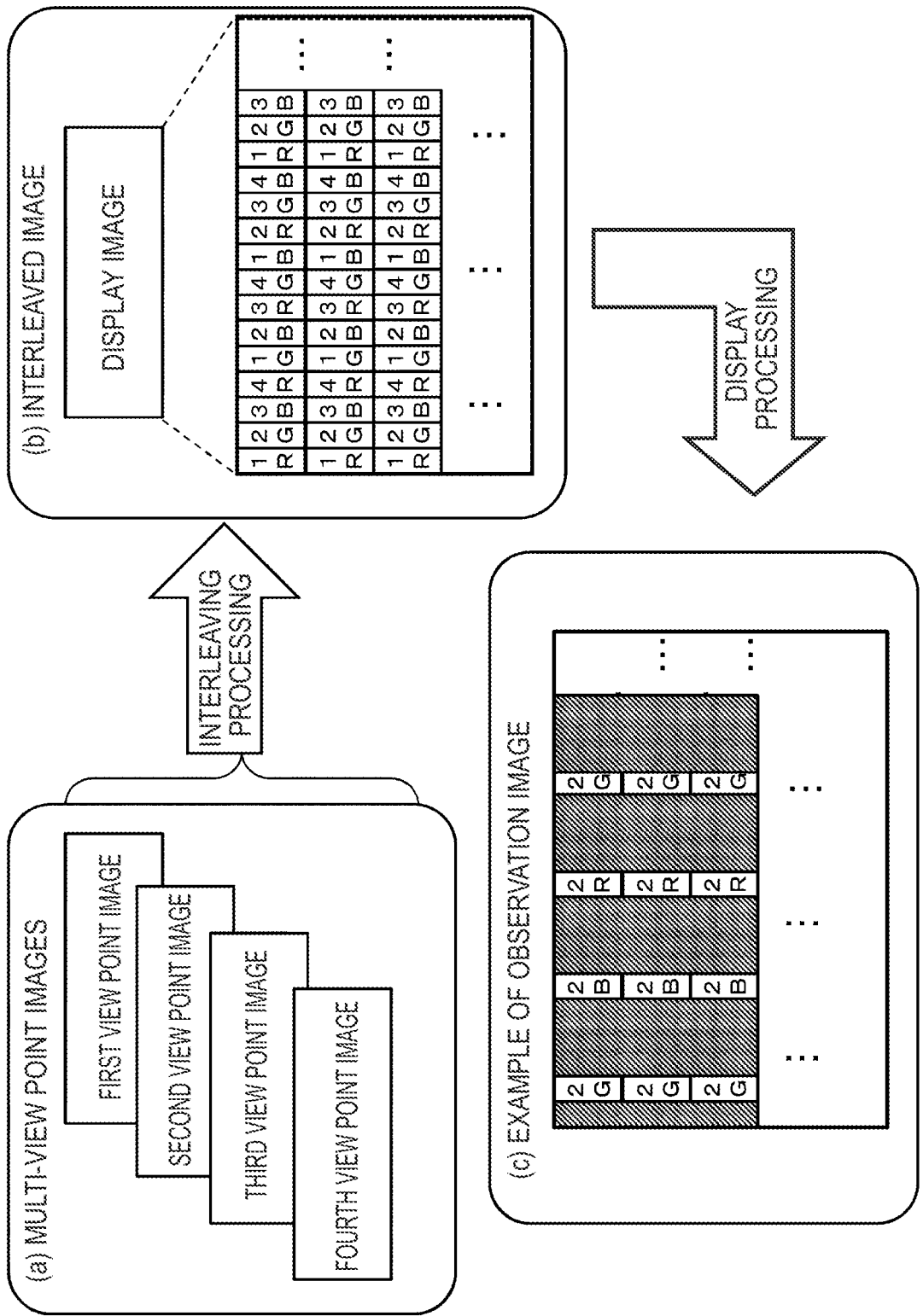
FIG. 3 is a figure explaining an example of display processing of multi-view point images.

FIG. 3 illustrates an example of display processing using first view point to fourth view point images where the number N of multi-view point images including the received LR images is 4.

FIG. 3 (a) multi-view point images illustrate multi-view point images including the received LR images.

First, an image is generated by interleaving these four view point images.

This is FIG. 3 (b) interleaved image.

For example, a first view point image to a fourth view point image are arranged in the horizontal direction, and the interleaved image is generated.

In the interleaved image, barriers according to the observation directions are set, so that when observed from a certain direction, only a particular view point image is configured to be observed.

FIG. 3 (c) observation image example illustrates an example of image observed by either the left eye or the right eye of the observer from a certain observation position.

This example is a barrier setting in which the second view point image is observed.

In order to perceive this as a three-dimensional image, it is necessary for the left eye and the right eye of the observer to respectively perceive observation images from different view point positions.

More specifically, for example, as illustrated in FIG. 4, this may be a setting as follows: the second view point image is perceived as (c1) left eye view point image, and the fourth view point image is perceived as (c2) right eye view point image.

The naked eye 3D display apparatus using the barrier method performs display processing so that the barrier and the observation image are in different settings in accordance with the observation position of the observer as described above.

In the lenticular method, a pair of different view point images are also respectively observed with the left eye and the right eye of the observer in accordance with the observation position.

In the image display processing in step S104, the 3D image display processing is executed so that a pair of different view point images are observed according to the observation position of the observer as described above.

[1-2. Determining Processing of Virtual View Point Positions According to First Embodiment]

Subsequently, the details of the determining processing of the virtual view point positions executed in step S102 in the flowchart as illustrated in FIG. 1 will be explained.

Figure 5:
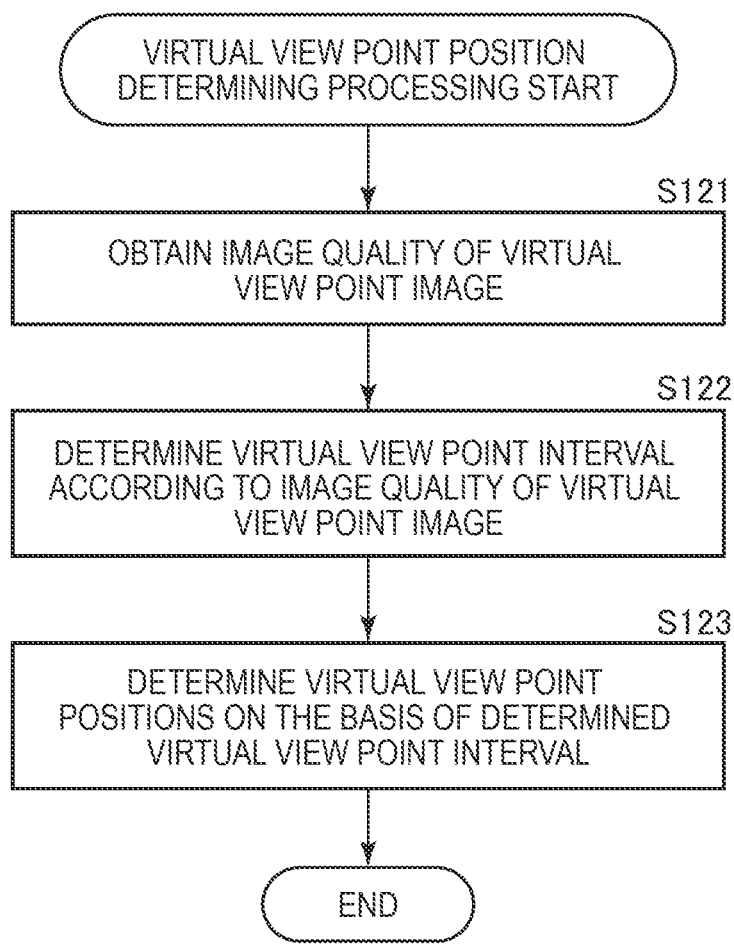
FIG. 5 is a figure illustrating a flowchart for explaining an example of processing of virtual view point position determining processing sequence executed by an image processing apparatus.

FIG. 5 is a flowchart for explaining a detailed sequence of the determining processing of the virtual view point positions executed in step S102 in the flowchart as illustrated in FIG. 1.

First, a series of processing of the determining processing of the virtual view point positions will be explained with reference to this flowchart.

First, in step S121, the quality of the virtual view point image is estimated. More specifically, an image quality evaluation value (Q) is calculated.

Subsequently, in step S122, a virtual view point interval (G) is determined according to the image quality (image quality evaluation value (Q)) of the virtual view point images obtained in step S121.

Finally, in step S123, the virtual view point positions are determined according to the virtual view point interval (G) determined in step S122.

Hereinafter, the details of each of the above processing will be explained with reference to the drawings.

(S121: Estimating Processing of Image Quality)

First, calculation processing of the qualities of the virtual view point images (image quality evaluation value (Q)) executed in step S121 will be explained with reference to FIG. 6 and the like.

The virtual view point images are obtained by executing the linear interpolation processing and the like using the received LR images as explained with reference to FIG. 2 above.

In other words, usable images are only two images of the received left eye image (L image) and the received right eye image (R image).

When the virtual view point images are generated with such settings, the image quality of the generated virtual view point images has the following tendency (a) "A case where parallax detection fails" or "a case where the precision of the parallax detection is low", the quality of the generated virtual view point videos is reduced.

(b) In a case of "a complicated image" or "an image in which occlusion occurs much", the quality of the generated virtual view point videos is reduced.

Like FIG. 2 explained above, FIG. 6 shows an original left eye image (L image) 121 and an original right eye image (R image) 122 which are received by the image processing apparatus, and also shows a virtual view point image 123 generated based on these LR images.

The view point position of the left eye image (L image) 121 is defined as 0.0, and the view point position of the right eye image (R image) 122 is defined as 1.0.

Figure 6:
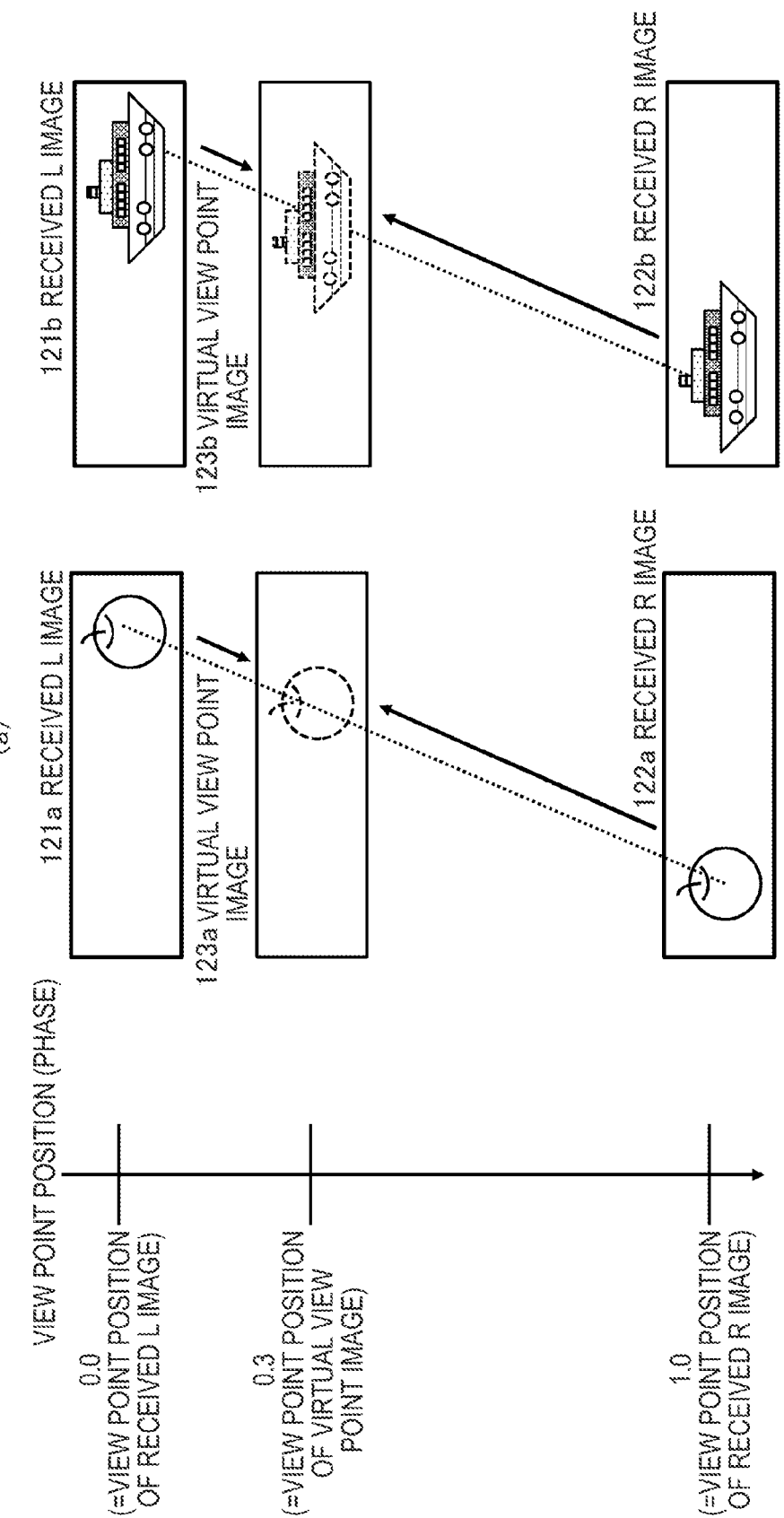
FIG. 6 is a figure illustrating an image quality of a virtual view point image.

FIG. 6 illustrates an example of processing where, for example, an observation image from a view point position of 0.3, which is between view point positions of 0.0 to 1.0, is generated as a virtual view point image 123.

FIG. 6 (a) illustrates an example of processing performed on a not complicated image. FIG. 6 (b) illustrates an example of processing performed on a complicated image.

In general, when the complexity of an image increases, the qualities of the virtual view point images is reduced.

For example, the following method is applied as an example of estimating method of the qualities of the virtual view point images.

(A) Estimating processing of the virtual view point image quality in accordance with the degree of reliability of parallax information (B) Estimating processing of the virtual view point image quality based on comparison result between the virtual view point images generated based on the received images and the received images (C) Generating actually used virtual view point images, and quality estimating processing based on the generated images For example, the quality evaluation value Q of the virtual view point images is calculated with any one of the above processing (A) to (C) or a combination of the above processing (A) to (C).

Specific example of the processing will be explained.

(A) Estimating processing of the virtual view point image quality in accordance with the degree of reliability of parallax information First, the estimating processing of the virtual view point image quality in accordance with the degree of reliability of parallax information will be explained.

This processing is processing in which the degree of reliability of the parallax information obtained in step S101 as illustrated in the flow of FIG. 1 (for example, depth map) is calculated, and this parallax information reliability degree is defined as the image quality.

As described above, the parallax information is generated based on the received LR images, and for example, the parallax information is data generated by processing such as block matching and the like. In some cases, error may occur in this processing, and when this parallax information is incorrect, the quality of the generated virtual view point image is reduced.

As described above, the image quality of the virtual view point image is closely related to the precision of the parallax information. Therefore, the precision of the parallax information is calculated, and this can be defined as the image qualities of the virtual view point images.

Figure 7:
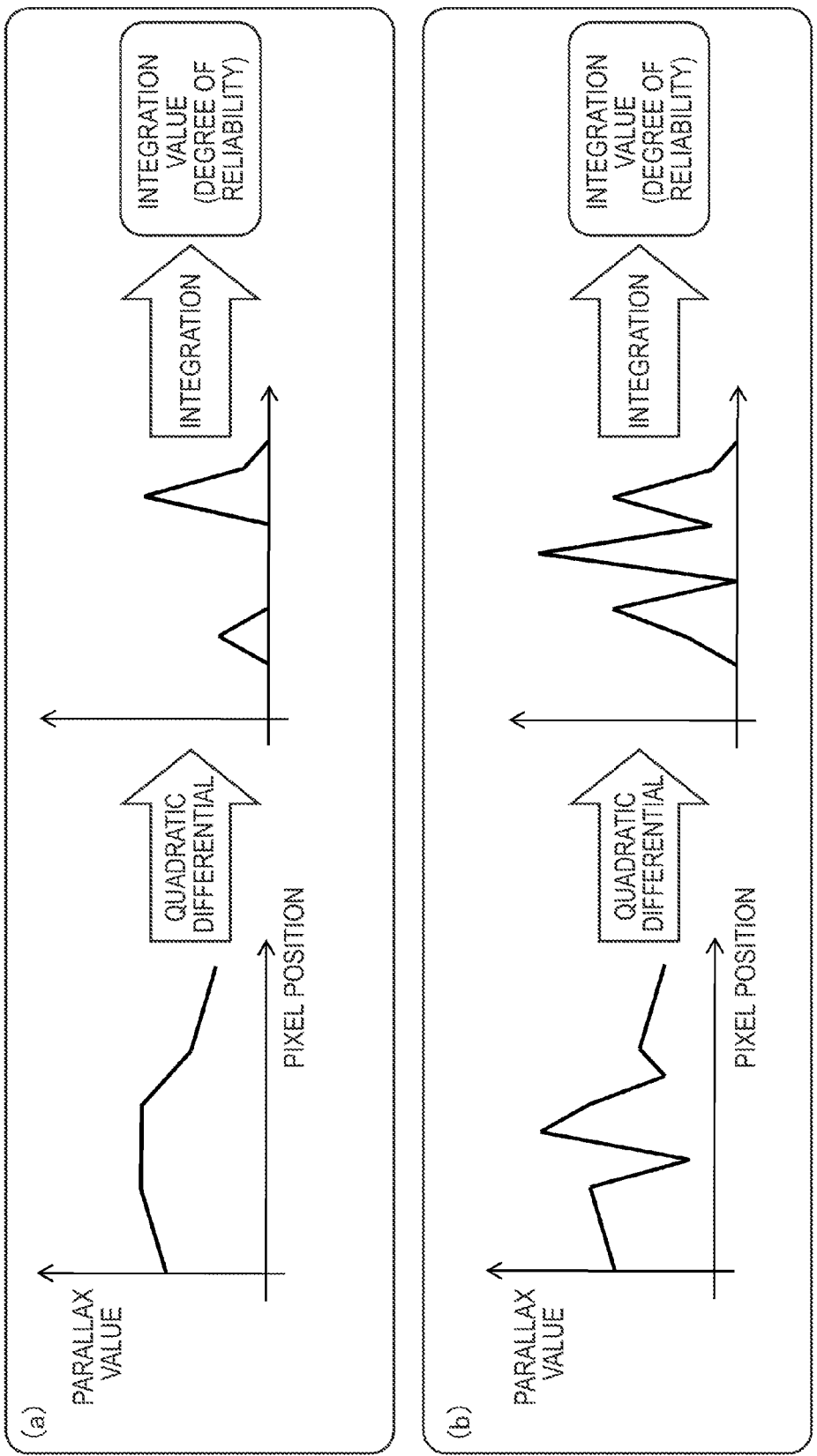
FIG. 7 are figures explaining an example of calculation processing of an image quality of a virtual view point image.

A specific example of calculation method will be explained with reference to FIGS. 7A and 7B.

FIGS. 7A and 7B illustrate an example of processing in which quadratic differentials of the parallax values obtained from the received LR images are integrated, and this integration value is defined as the degree of reliability of the parallax information, and determination is made as follows: the smaller the integration value is, the higher the degree of reliability of the parallax information is determined to be.

The parallax obtained from the LR images represents a distribution according to the subject distance, but for example, when a subject of a certain distance exists, the value of the parallax corresponding to this single subject is constant where the parallax information is calculated correctly. However, when it is not correctly calculated, various values occur. In other words, the parallax value varies.

More specifically, when the parallax is correctly obtained, the influence caused by noises and the like is low, and the parallax value tends to become smooth as illustrated in FIG. 7A, and the integration value of the quadratic differentials of the parallax values decreases. In such case, the parallax information reliability degree is determined to be high, and as a result, the image qualities of the virtual view point images is also determined to be high (i.e., the quality evaluation value Q of the virtual view point images is high).

On the other hand, when the parallax is not correctly obtained, the parallax values are dispersed to various values and tend to vary due to the influence of the noise and the like as illustrated in FIG. 7B, and accordingly, the integration value of the quadratic differentials of the parallax values increases. In such case, the parallax information reliability degree is determined to be low, and as a result, the image qualities of the virtual view point images is also determined to be low (i.e., the quality evaluation value Q of the virtual view point images is low).

It should be noted that the reliability degree determining processing of the parallax information is not limited to such processing. Another example of method includes calculating correlation between a distance image including parallax information (depth map) and original images and calculating the correlation value as the degree of reliability. Such method may also be applied.

(B) Estimating processing of the virtual view point image quality based on comparison result between the virtual view point images generated based on the received images and the received images Subsequently, a specific example of estimating processing of the virtual view point image quality based on comparison result between the virtual view point images generated based on the received images and the received images will be explained with reference to FIG. 8.

The processing of (B) is processing in which, for example, a virtual view point image R' corresponding to the R image from a view point position of 1.0 is generated using the received left eye image (L image) from a view point position of 0.0, and the generated virtual view point image R' and the received right eye image (R image), i.e., received image, are compared, and according to the difference, the quality of the virtual view point image is determined.

In other words, when the difference is large, the quality of the virtual view point image is determined to be low, and when the difference is small, the quality of the virtual view point image is determined to be high.

Likewise, a virtual view point image L' corresponding to the L image from a view point position of 0.0 is generated using the received right eye image (R image) from a view point position of 1.0, and the generated virtual view point image L' and the received left eye image (L image), i.e., received image, are compared, and according to the difference, the quality of the virtual view point image is determined.

Figure 8:
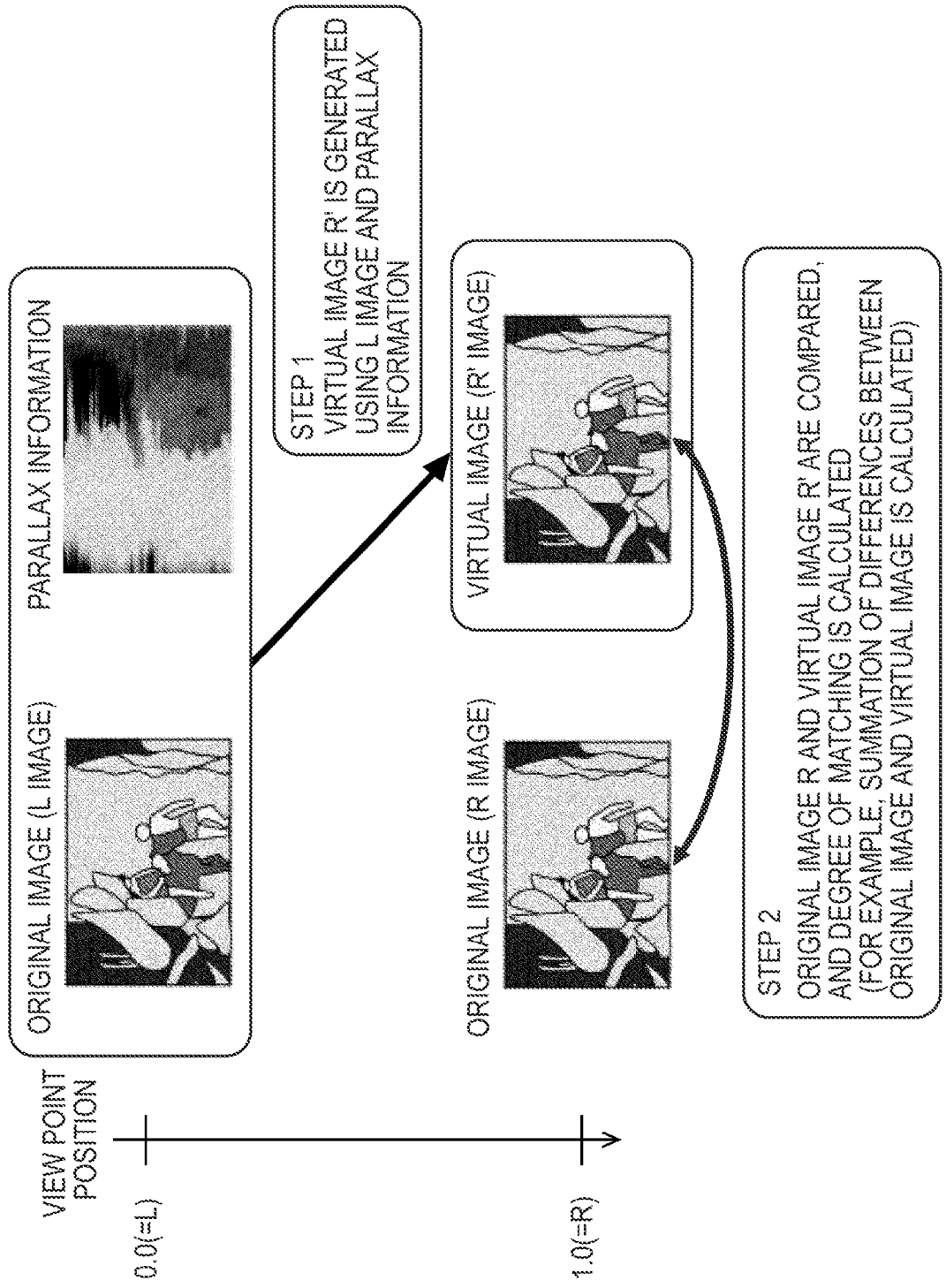
FIG. 8 is a figure explaining an example of calculation processing of an image quality of a virtual view point image.

FIG. 8 shows an example of processing as follows.

Step 1: processing of generating the virtual view point image R' corresponding to the R image of a view point position of 1.0 using the parallax information (depth map) and the received left eye image (L image) of a view point position of 0.0

Step 2: processing of comparing the generated virtual view point image R' and the received right eye image (R image), i.e., received image In the comparing processing of step 2, for example, a summation of differences between the two images is calculated, and when the difference is smaller, the virtual view point image R' is determined to be a more correct image, and the degree of reliability is determined to be high (=the quality evaluation value Q of the virtual view point image is determined to be high), and when the difference is larger, the virtual view point image R' is determined to be a more incorrect image, and the degree of reliability is determined to be low (=the quality evaluation value Q of the virtual view point image is determined to be low).

The quality evaluation value Q of the virtual view point image can be calculated according to this kind of image comparison.

(Step S122: Determining Processing of Virtual View Point Interval)

Subsequently, the processing of step S122, i.e., a specific example of processing for determining the virtual view point interval (G) in accordance with the image qualities of the virtual view point images (image quality evaluation value (Q)) obtained in step S121, will be explained.

In this processing, the virtual view point interval (G) is determined by applying the following parameters.

Q: virtual view point image quality evaluation value (value calculated in step S121)

Q': virtual view point interval calculation parameter (user input)

By applying these parameters, the virtual view point interval (G) is determined.

On the basis of these parameters Q, Q', the virtual view point interval (G) is calculated by the following expression.

$$G=Q/Q'$$

Where N is the total number of virtual view points, $Q_{max}$ is the maximum value of the quality evaluation value of the image, $Q'=Q_{max}*N$ holds, then the following expression holds. When the virtual view point image quality evaluation value Q is at the maximum value $Q_{max}$, $G=Q/Q'=1/N$ holds. For example, where the view point positions of the received LR images are as follows: L image view point position=0.0, R image view point position=1.0, then, the virtual view point positions are positions obtained by dividing the length between the view point position 0.0 and the view point position 1.0 by N.

A value set in advance or a user input value is applied as the total number (N) of virtual view points, in accordance with, for example, the display apparatus (display).

(Step S123: The Determining Processing of the Virtual View Point Positions)

Subsequently, the processing of step S123, i.e., a specific example of processing for determining the virtual view point positions in accordance with the virtual view point interval (G) obtained in step S122, will be explained.

First, the parameters applied in determining the virtual view point positions will be explained. The parameters applied in determining the virtual view point positions include the following parameters.

N: the total number of virtual view points

P(i): the i-th virtual view point positions [i=0, 1, 2, ... N-2, N-1]

G: virtual view point interval

Nfix: the number of virtual view point position set as the reference position (=reference virtual view point position)

Pfix: the virtual view point position set as the reference position (=reference virtual view point position)

It should be noted that the following relational expression holds as a relational expression of the above parameters.

$$P(i)=Pfix+(1-Nfix) \times G$$

Among the above parameters, a value set in advance or a user input value is applied as the total number (N) of virtual view points, in accordance with, for example, the display apparatus (display).

The virtual view point position P (i) is virtual view point position information determined by the processing of this step S123.

The virtual view point interval (G) is a value determined in the processing of step S122 explained above.

The reference virtual view point position (Pfix) and the number thereof (Nfix) are values that can be freely set. For example, the reference virtual view point position (Pfix) and the number thereof (Nfix) are user input values.

It should be noted that, for example, the virtual view point position number at the left end of the multiple virtual view point positions is defined as 0, and the reference virtual view point position number (Nfix) is set as 1, 2, 3, . . . toward the right side.

Hereinafter, an example of setting of virtual view point positions where the reference virtual view point position (Pfix) and the number thereof (Nfix) are set as various values in the setting where the total number of virtual view points N is 9 will be explained with reference to FIGS. 9 to 13.

(Virtual View Point Position Determining Processing Example 1)

The virtual view point position determining processing example 1 will be explained with reference to FIG. 9.

This processing example 1 is an example of determining processing of virtual view point positions in accordance with the following setting.

The total number of virtual view points: N=9

Reference virtual view point position number: Nfix=8

Reference virtual view point position: Pfix=1.0 (received right eye image (R image) view point position)

Virtual view point interval: G=4/32, 3/32, 1/32, 5/32

Figure 9:
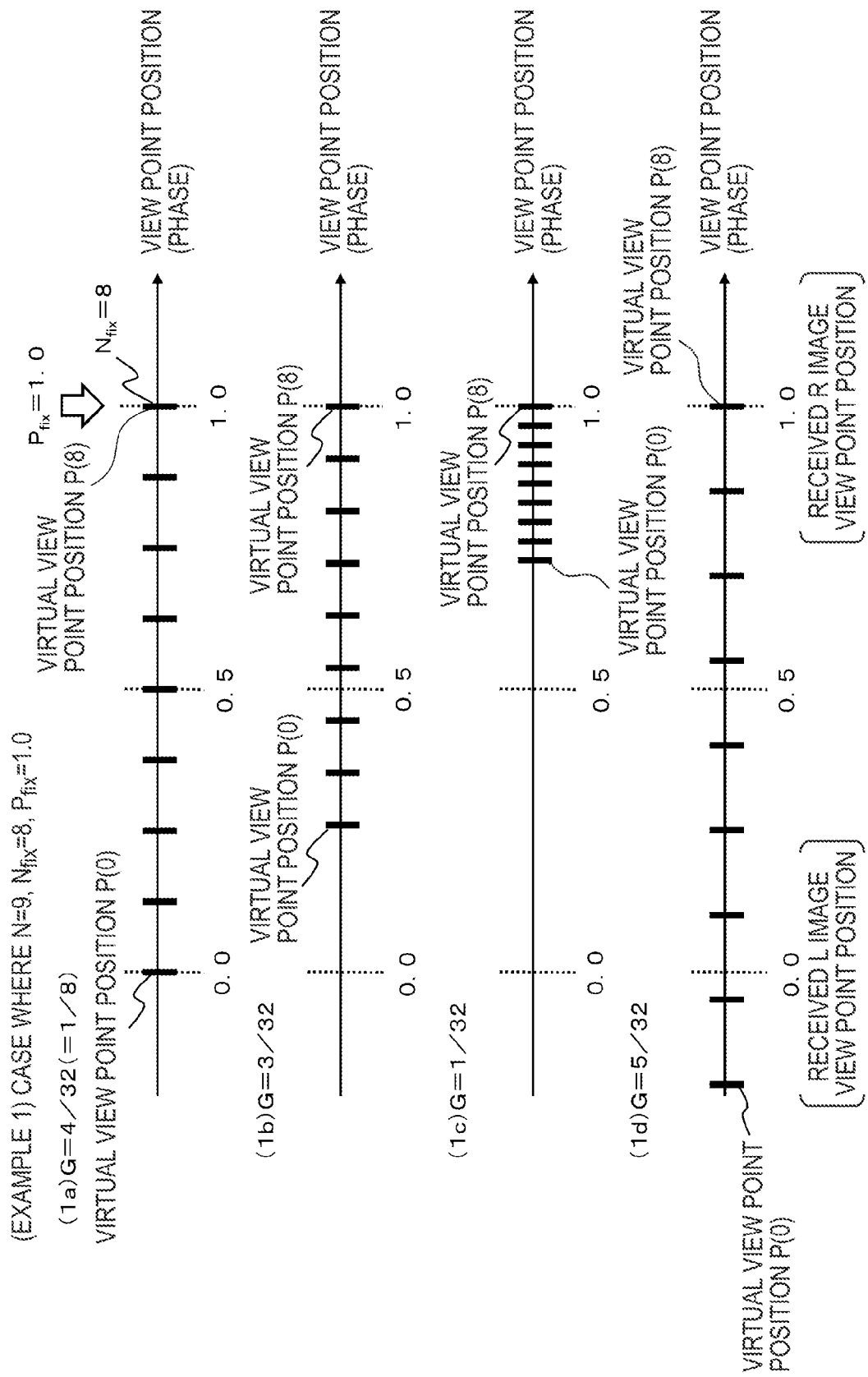
FIG. 9 is a figure explaining an example of determining processing of virtual view point positions corresponding to respective view point positions of virtual view point images of N view points.

FIG. 9 illustrates a virtual view point position determining processing example of the following four patterns.

(1a) N=9, Nfix=8, Pfix=1.0, G=4/32
(1b) N=9, Nfix=8, Pfix=1.0, G=3/32
(1c) N=9, Nfix=8, Pfix=1.0, G=1/32
(1d) N=9, Nfix=8, Pfix=1.0, G=5/32

This shows an example in which nine thick lines as illustrated in (1a) to (4a) are virtual view point positions, and totally nine (N=9) virtual view point positions from the left end virtual view point position P(0) to the right end virtual view point position P(8) are set with a regular interval of interval G [(1a) G=4/32, (1b) G=3/32, (1c) G=1/32, (1d) G=5/32].

(1a) is an example where N=9, Nfix=8, Pfix=1.0, G=4/32.

First, the virtual view point P(8) of the reference virtual view point position number Nfix=8 is set at the reference virtual view point position Pfix=1.0, in accordance with the following setting condition: the reference virtual view point position Pfix=1.0 (received right eye image (R image) view point position) and the reference virtual view point position number Nfix=8.

Subsequently, the remaining virtual view points P(0) to P(7) are set with a virtual view point interval G=4/32 from the reference position at which the virtual view point P(8) is set.

With this processing, nine virtual view point positions P(0) to P(8) as illustrated in (1a) are set.

(1b) is an example where N=9, Nfix=8, Pfix=1.0, G=3/32.

First, the virtual view point P(8) of the reference virtual view point position number Nfix=8 is set at the reference virtual view point position Pfix=1.0, in accordance with the following setting condition: the reference virtual view point position Pfix=1.0 (received right eye image (R image) view point position) and the reference virtual view point position number Nfix=8.

Subsequently, the remaining virtual view points P(0) to P(7) are set with a virtual view point interval G=3/32 from the reference position at which the virtual view point P(8) is set.

With this processing, nine virtual view point positions P(0) to P(8) as illustrated in (1b) are set.

(1c) is an example where N=9, Nfix=8, Pfix=1.0, G=1/32.

First, the virtual view point P(8) of the reference virtual view point position number Nfix=8 is set at the reference virtual view point position Pfix=1.0, in accordance with the following setting condition: the reference virtual view point position Pfix=1.0 (received right eye image (R image) view point position) and the reference virtual view point position number Mix=8.

Subsequently, the remaining virtual view points P(0) to P(7) are set with a virtual view point interval G=1/32 from the reference position at which the virtual view point P(8) is set.

With this processing, nine virtual view point positions P(0) to P(8) as illustrated in (1c) are set.

(1d) is an example where N=9, Nfix=8, Pfix=1.0, G=5/32.

First, the virtual view point P(8) of the reference virtual view point position number Nfix=8 is set at the reference virtual view point position Pfix=1.0, in accordance with the following setting condition: the reference virtual view point position Pfix=1.0 (received right eye image (R image) view point position) and the reference virtual view point position number Nfix=8.

Subsequently, the remaining virtual view points P(0) to P(7) are set with a virtual view point interval G=5/32 from the reference position at which the virtual view point P(8) is set.

With this processing, nine virtual view point positions P(0) to P(8) as illustrated in (1d) are set.

(Virtual View Point Position Determining Processing Example 2)

Subsequently, the virtual view point position determining processing example 2 will be explained with reference to FIG. 10.

This processing example 2 is an example of determining processing of virtual view point positions in accordance with the following setting.

The total number of virtual view points: N=9
Reference virtual view point position number: Nfix=0
Reference virtual view point position: Pfix=0.0 (received left eye image (L image) view point position)
Virtual view point interval: G=4/32, 3/32, 1/32, 5/32

Figure 10:
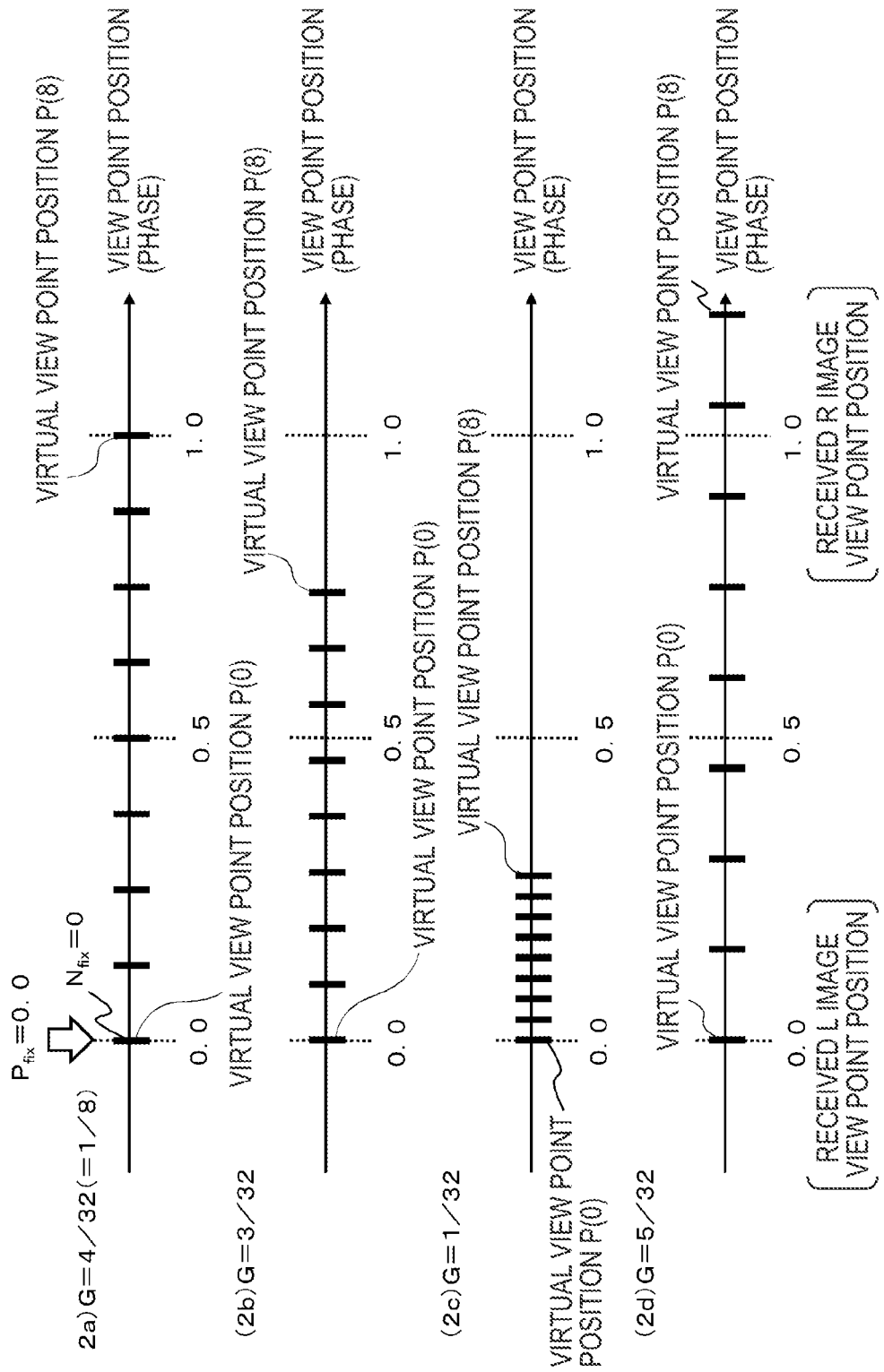
FIG. 10 is a figure explaining an example of determining processing of virtual view point positions corresponding to respective view point positions of virtual view point images of N view points.

FIG. 10 illustrates a virtual view point position determining processing example of the following four patterns.

(2a) N=9, Nfix=0, Pfix=0.0, G=4/32
(2b) N=9, Nfix=0, Pfix=0.0, G=3/32
(2c) N=9, Nfix=0, Pfix=0.0, G=1/32
(2d) N=9, Nfix=0, Pfix=0.0, G=5/32

This shows an example in which nine thick lines as illustrated in (2a) to (2d) are virtual view point positions, and totally nine (N=9) virtual view point positions from the left end virtual view point position P(0) to the right end virtual view point position P(8) are set with a regular interval of interval G [(2a) G=4/32, (2b) G=3/32, (2c) G=1/32, (2d) G=5/32].

(2a) is an example where N=9, Nfix=0, Pfix=0.0, G=4/32.

First, the virtual view point P(0) of the reference virtual view point position number Nfix=0 is set at the reference virtual view point position Pfix=0.0, in accordance with the following setting condition: the reference virtual view point position Pfix=0.0 (received left eye image (L image) view point position) and the reference virtual view point position number Nfix=0.

Subsequently, the remaining virtual view points P(1) to P(8) are set with a virtual view point interval G=4/32 from the reference position at which the virtual view point P(0) is set.

With this processing, nine virtual view point positions P(0) to P(8) as illustrated in (2a) are set.

(2b) is an example where N=9, Nfix=0, Pfix=0.0, G=3/32.

First, the virtual view point P(0) of the reference virtual view point position number Nfix=0 is set at the reference virtual view point position Pfix=0.0, in accordance with the following setting condition: the reference virtual view point position Pfix=0.0 (received left eye image (L image) view point position) and the reference virtual view point position number Nfix=0.

Subsequently, the remaining virtual view points P(1) to P(8) are set with a virtual view point interval G=3/32 from the reference position at which the virtual view point P(0) is set.

With this processing, nine virtual view point positions P(0) to P(8) as illustrated in (2b) are set.

(2c) is an example where N=9, Nfix=0, Pfix=0.0, G=1/32.

First, the virtual view point P(0) of the reference virtual view point position number Nfix=0 is set at the reference virtual view point position Pfix=0.0, in accordance with the following setting condition: the reference virtual view point position Pfix=0.0 (received left eye image (L image) view point position) and the reference virtual view point position number Nfix=0.

Subsequently, the remaining virtual view points P(1) to P(8) are set with a virtual view point interval G=1/32 from the reference position at which the virtual view point P(0) is set.

With this processing, nine virtual view point positions P(0) to P(8) as illustrated in (2c) are set.

(2d) is an example where N=9, Nfix=0, Pfix=0.0, G=5/32.

First, the virtual view point P(0) of the reference virtual view point position number Nfix=0 is set at the reference virtual view point position Pfix=0.0, in accordance with the following setting condition: the reference virtual view point position Pfix=0.0 (received left eye image (L image) view point position) and the reference virtual view point position number Nfix=0.

Subsequently, the remaining virtual view points P(1) to P(8) are set with a virtual view point interval G=5/32 from the reference position at which the virtual view point P(0) is set.

With this processing, nine virtual view point positions P(0) to P(8) as illustrated in (2d) are set.

(Virtual View Point Position Determining Processing Example 3)

Subsequently, the virtual view point position determining processing example 3 will be explained with reference to FIG. 11.

This processing example 3 is an example of determining processing of virtual view point positions in accordance with the following setting.

The total number of virtual view points: N=9
Reference virtual view point position number: Nfix=4
Reference virtual view point position: Pfix=0.0 (received left eye image (L image) view point position)
Virtual view point interval: G=4/32, 3/32, 1/32, 5/32

Figure 11:
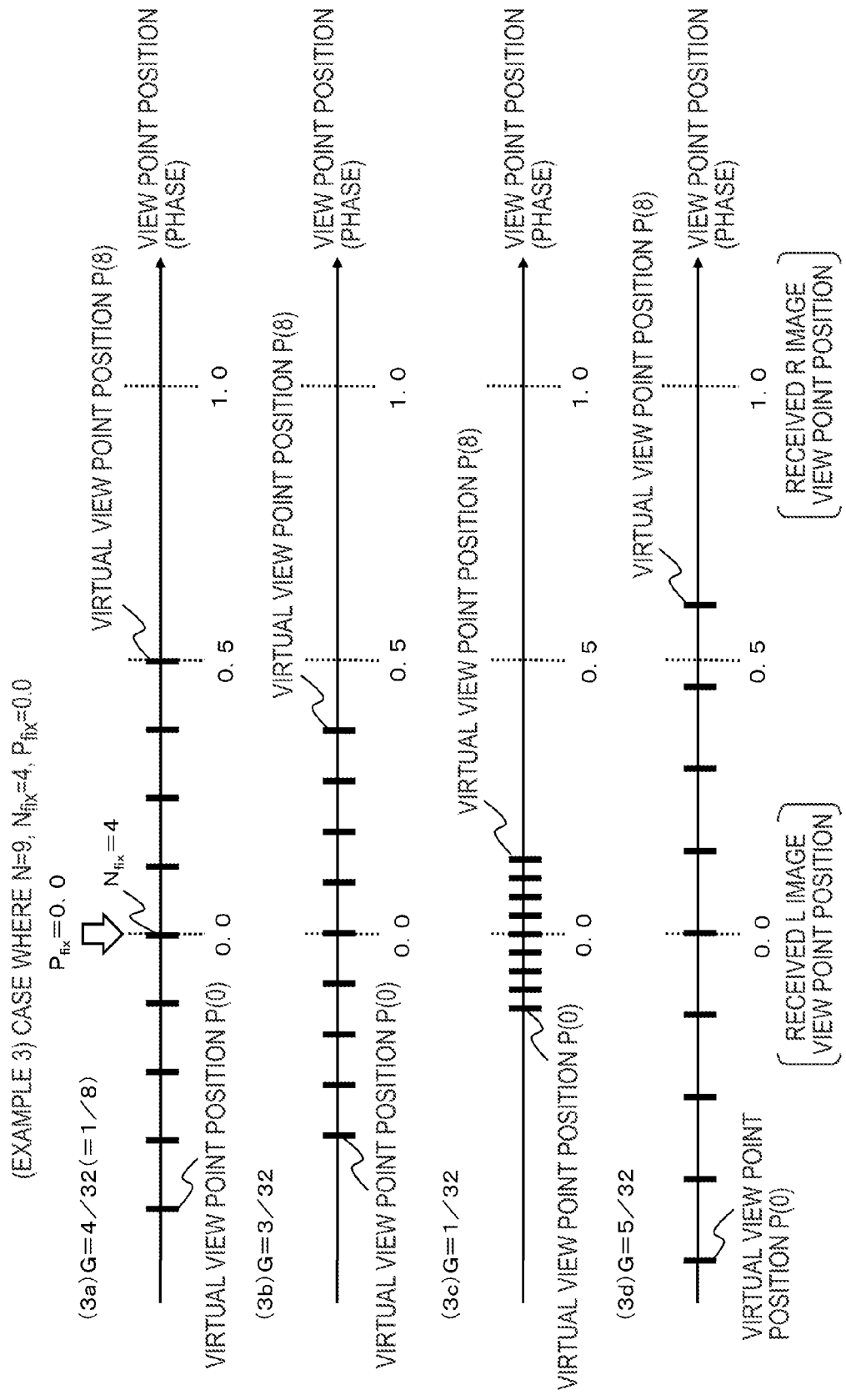
FIG. 11 is a figure explaining an example of determining processing of virtual view point positions corresponding to respective view point positions of virtual view point images of N view points.

FIG. 11 illustrates a virtual view point position determining processing example of the following four patterns.

(3a) N=9, Nfix=4, Pfix=0.0, G=4/32
(3b) N=9, Nfix=4, Pfix=0.0, G=3/32
(3c) N=9, Nfix=4, Pfix=0.0, G=1/32
(3d) N=9, Nfix=4, Pfix=0.0, G=5/32

This shows an example in which nine thick lines as illustrated in (3a) to (3a) are virtual view point positions, and totally nine (N=9) virtual view point positions from the left end virtual view point position P(0) to the right end virtual view point position P(8) are set with a regular interval of interval G [(3a) G=4/32, (3b) G=3/32, (3c) G=1/32, (3d) G=5/32].

(3a) is an example where N=9, Nfix=4, Pfix=0.0, G=4/32.

First, the virtual view point P(4) of the reference virtual view point position number Nfix=4 is set at the reference virtual view point position Pfix=0.0, in accordance with the following setting condition: the reference virtual view point position Pfix=0.0 (received left eye image (L image) view point position) and the reference virtual view point position number Nfix=4.

Subsequently, the remaining virtual view points P(0) to P(3) and P(5) to P(8) are set with a virtual view point interval G=4/32 from the reference position at which the virtual view point P(4) is set.

With this processing, nine virtual view point positions P(0) to P(8) as illustrated in (3a) are set.

(3b) is an example where N=9, Nfix=4, Pfix=0.0, G=3/32.

First, the virtual view point P(4) of the reference virtual view point position number Nfix=4 is set at the reference virtual view point position Pfix=0.0, in accordance with the following setting condition: the reference virtual view point position Pfix=0.0 (received left eye image (L image) view point position) and the reference virtual view point position number Nfix=4.

Subsequently, the remaining virtual view points P(0) to P(3) and P(5) to P(8) are set with a virtual view point interval G=3/32 from the reference position at which the virtual view point P(4) is set.

With this processing, nine virtual view point positions P(0) to P(8) as illustrated in (3b) are set.

(3c) is an example where N=9, Nfix=4, Pfix=0.0, G=1/32. First, the virtual view point P(4) of the reference virtual view point position number Nfix=4 is set at the reference virtual view point position Pfix=0.0, in accordance with the following setting condition: the reference virtual view point position Pfix=0.0 (received left eye image (L image) view point position) and the reference virtual view point position number Nfix=4.

Subsequently, the remaining virtual view points P(0) to P(3) and P(5) to P(8) are set with a virtual view point interval G=1/32 from the reference position at which the virtual view point P(4) is set.

With this processing, nine virtual view point positions P(0) to P(8) as illustrated in (3c) are set.

(3d) is an example where N=9, Nfix=4, Pfix=0.0, G=5/32.

First, the virtual view point P(4) of the reference virtual view point position number Nfix=4 is set at the reference virtual view point position Pfix=0.0, in accordance with the following setting condition: the reference virtual view point position Pfix=0.0 (received left eye image (L image) view point position) and the reference virtual view point position number Nfix=4.

Subsequently, the remaining virtual view points P(0) to P(3) and P(5) to P(8) are set with a virtual view point interval G=5/32 from the reference position at which the virtual view point P(4) is set.

With this processing, nine virtual view point positions P(0) to P(8) as illustrated in (3d) are set.

(Virtual View Point Position Determining Processing Example 4)

Subsequently, the virtual view point position determining processing example 4 will be explained with reference to FIG. 12.

This processing example 4 is an example of determining processing of virtual view point positions in accordance with the following setting.

The total number of virtual view points: N=9
Reference virtual view point position number: Nfix=2
Reference virtual view point position: Pfix=0.0 (received left eye image (L image) view point position)
Virtual view point interval: G=4/32, 3/32, 1/32, 5/32

Figure 12:
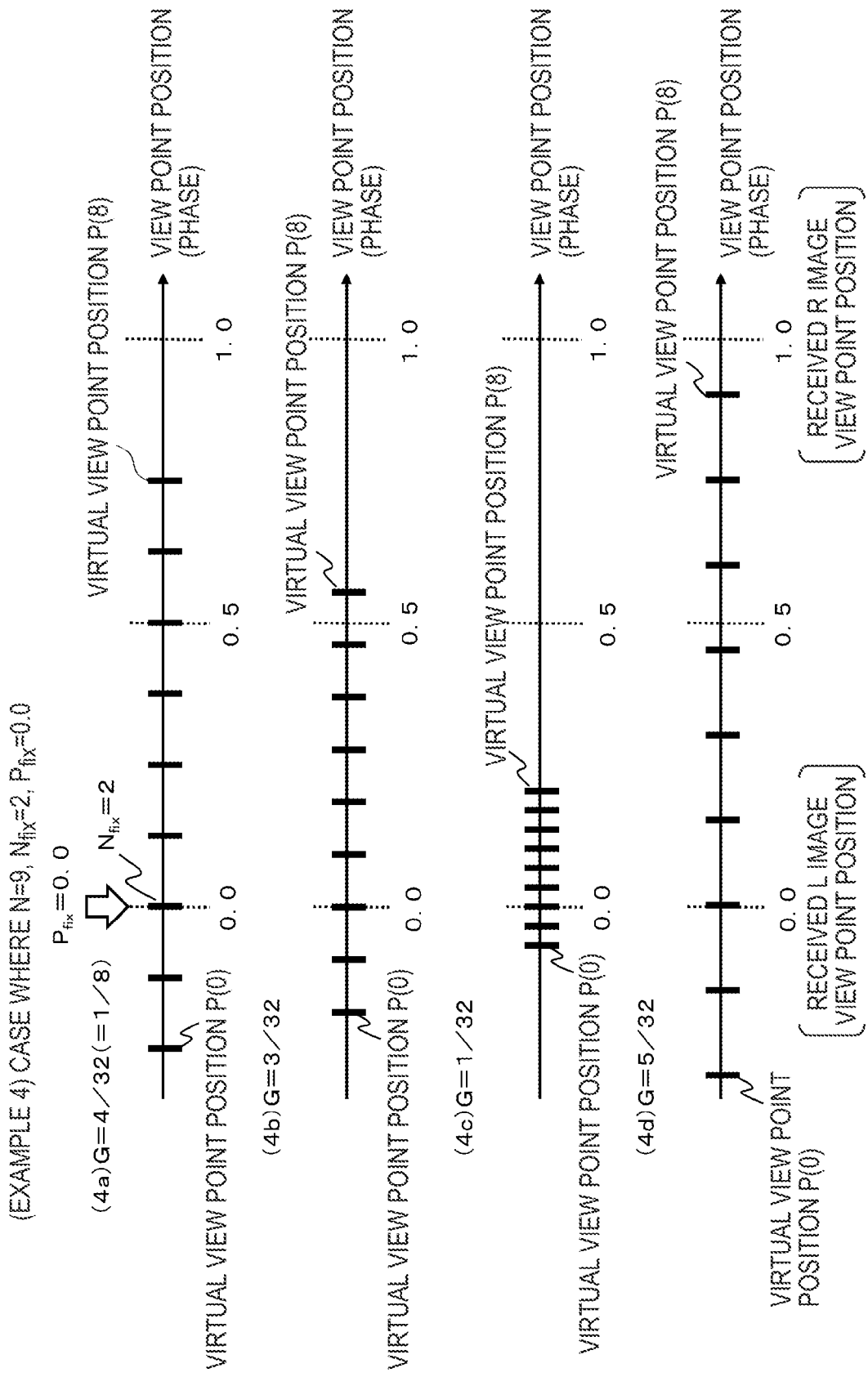
FIG. 12 is a figure explaining an example of determining processing of virtual view point positions corresponding to respective view point positions of virtual view point images of N view points.

FIG. 12 illustrates a virtual view point position determining processing example of the following four patterns.

(4a) N=9, Nfix=2, Pfix=0.0, G=4/32
(4b) N=9, Nfix=2, Pfix=0.0, G=3/32
(4c) N=9, Nfix=2, Pfix=0.0, G=1/32
(4d) N=9, Nfix=2, Pfix=0.0, G=5/32

This shows an example in which nine thick lines as illustrated in (4a) to (4d) are virtual view point positions, and totally nine (N=9) virtual view point positions from the left end virtual view point position P(0) to the right end virtual view point position P(8) are set with a regular interval of interval G [(4a) G=4/32, (4b) G=3/32, (4c) G=1/32, (4d) G=5/32].

(4a) is an example where N=9, Nfix=2, Pfix=0.0, G=4/32.

First, the virtual view point P(2) of the reference virtual view point position number Nfix=2 is set at the reference virtual view point position Pfix=0.0, in accordance with the following setting condition: the reference virtual view point position Pfix=0.0 (received left eye image (L image) view point position) and the reference virtual view point position number Nfix=2.

Subsequently, the remaining virtual view points P(0) to P(1) and P(3) to P(8) are set with a virtual view point interval G=4/32 from the reference position at which the virtual view point P(2) is set.

With this processing, nine virtual view point positions P(0) to P(8) as illustrated in (4a) are set.

(4b) is an example where N=9, Nfix=2, Pfix=0.0, G=3/32.

First, the virtual view point P(2) of the reference virtual view point position number Nfix=2 is set at the reference virtual view point position Pfix=0.0, in accordance with the following setting condition: the reference virtual view point position Pfix=0.0 (received left eye image (L image) view point position) and the reference virtual view point position number Nfix=2.

Subsequently, the remaining virtual view points P(0) to P(1) and P(3) to P(8) are set with a virtual view point interval G=3/32 from the reference position at which the virtual view point P(2) is set.

With this processing, nine virtual view point positions P(0) to P(8) as illustrated in (4b) are set.

(4c) is an example where N=9, Nfix=2, Pfix=0.0, G=1/32.

First, the virtual view point P(2) of the reference virtual view point position number Nfix=2 is set at the reference virtual view point position Pfix=0.0, in accordance with the following setting condition: the reference virtual view point position Pfix=0.0 (received left eye image (L image) view point position) and the reference virtual view point position number Nfix=2.

Subsequently, the remaining virtual view points P(0) to P(1) and P(3) to P(8) are set with a virtual view point interval G=1/32 from the reference position at which the virtual view point P(2) is set.

With this processing, nine virtual view point positions P(0) to P(8) as illustrated in (4c) are set.

(4d) is an example where N=9, Nfix=2, Pfix=0.0, G=5/32.

First, the virtual view point P(2) of the reference virtual view point position number Nfix=2 is set at the reference virtual view point position Pfix=0.0, in accordance with the following setting condition: the reference virtual view point position Pfix=0.0 (received left eye image (L image) view point position) and the reference virtual view point position number Nfix=2.

Subsequently, the remaining virtual view points P(0) to P(1) and P(3) to P(8) are set with a virtual view point interval G=5/32 from the reference position at which the virtual view point P(2) is set.

With this processing, nine virtual view point positions P(0) to P(8) as illustrated in (4d) are set.

(Virtual View Point Position Determining Processing Example 5)

Subsequently, the virtual view point position determining processing example 5 will be explained with reference to FIG. 13.

This processing example 5 is an example of determining processing of virtual view point positions in accordance with the following setting.

The total number of virtual view points: N=9

Reference virtual view point position number: Nfix=4

Reference virtual view point position: Pfix=0.5 (view point position at the middle of the received left eye image (L image) and the received right eye image (R image))

Virtual view point interval: G=4/32, 3/32, 1/32, 5/32

Figure 13:
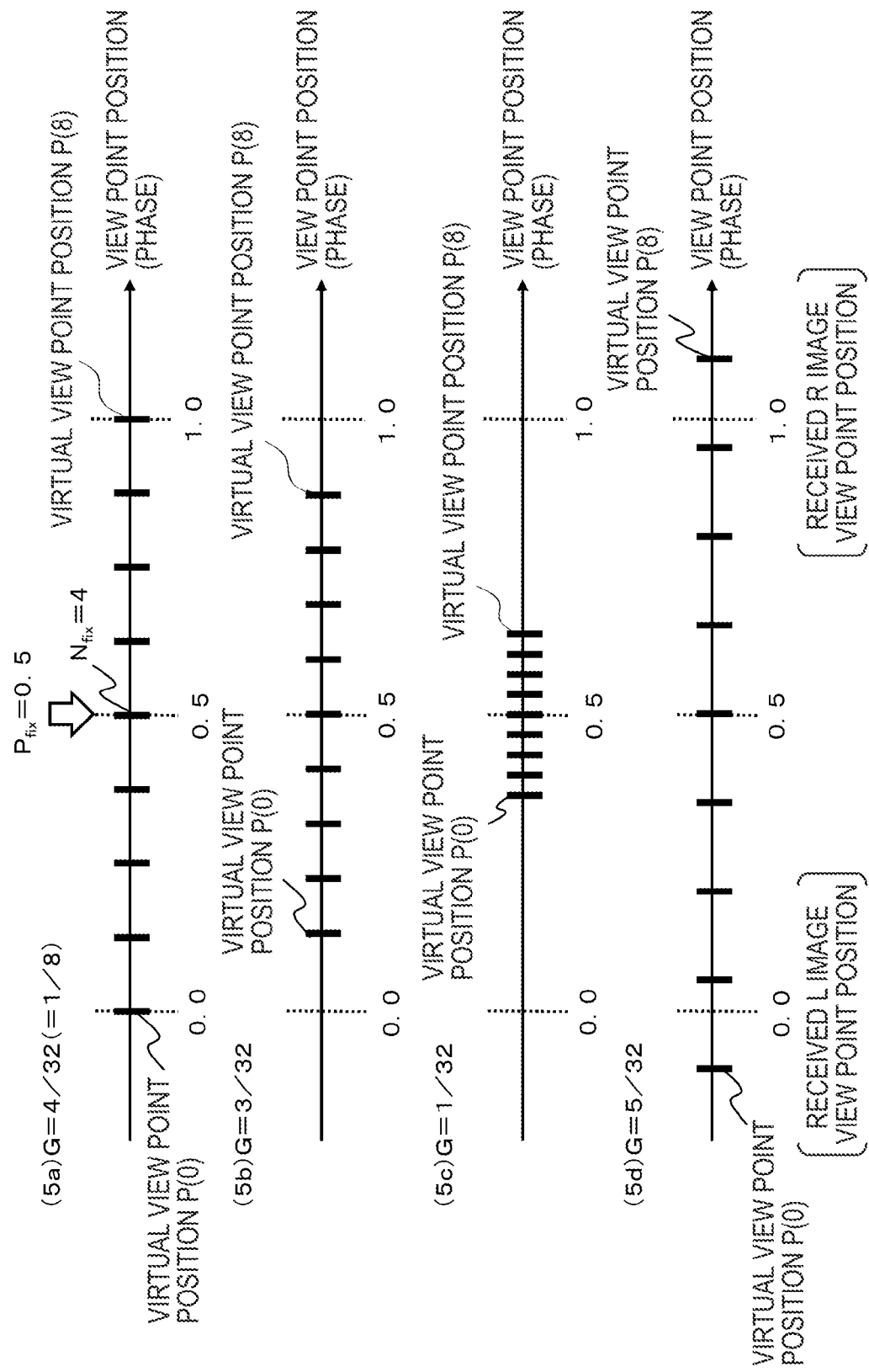
FIG. 13 is a figure explaining an example of determining processing of virtual view point positions corresponding to respective view point positions of virtual view point images of N view points.

FIG. 13 illustrates a virtual view point position determining processing example of the following four patterns.

(5a) N=9, Nfix=4, Pfix=0.5, G=4/32

(5b) N=9, Nfix=4, Pfix=0.5, G=3/32

(5c) N=9, Nfix=4, Pfix=0.5, G=1/32

(5d) N=9, Nfix=4, Pfix=0.5, G=5/32

This shows an example in which nine thick lines as illustrated in (5a) to (5d) are virtual view point positions, and totally nine (N=9) virtual view point positions from the left end virtual view point position P(0) to the right end virtual view point position P(8) are set with a regular interval of interval G [(5a) G=4/32, (5b) G=3/32, (5c) G=1/32, (5d) G=5/32].

(5a) is an example where N=9, Nfix=4, Pfix=0.5, G=4/32.

First, the virtual view point P(4) of the reference virtual view point position number Nfix=4 is set at the reference virtual view point position Pfix=0.5, in accordance with the following setting condition: the reference virtual view point position Pfix=0.5 (view point position at the middle of the received left eye image (L image) and the received right eye image (R image)) and the reference virtual view point position number Nfix=4.

Subsequently, the remaining virtual view points P(0) to P(3) and P(5) to P(8) are set with a virtual view point interval G=4/32 from the reference position at which the virtual view point P(4) is set.

With this processing, nine virtual view point positions P(0) to P(8) as illustrated in (5a) are set.

(5b) is an example where N=9, Nfix=4, Pfix=0.5, G=3/32.

First, the virtual view point P(4) of the reference virtual view point position number Nfix=4 is set at the reference virtual view point position Pfix=0.5, in accordance with the following setting condition: the reference virtual view point position Pfix=0.5 (view point position at the middle of the received left eye image (L image) and the received right eye image (R image)) and the reference virtual view point position number Nfix=4.

Subsequently, the remaining virtual view points P(0) to P(3) and P(5) to P(8) are set with a virtual view point interval G=3/32 from the reference position at which the virtual view point P(4) is set.

With this processing, nine virtual view point positions P(0) to P(8) as illustrated in (5b) are set.

(5c) is an example where N=9, Nfix=4, Pfix=0.5, G=1/32.

First, the virtual view point P(4) of the reference virtual view point position number Nfix=4 is set at the reference virtual view point position Pfix=0.5, in accordance with the following setting condition: the reference virtual view point position Pfix=0.5 (view point position at the middle of the received left eye image (L image) and the received right eye image (R image)) and the reference virtual view point position number Nfix=4.

Subsequently, the remaining virtual view points P(0) to P(3) and P(5) to P(8) are set with a virtual view point interval G=1/32 from the reference position at which the virtual view point P(4) is set.

With this processing, nine virtual view point positions P(0) to P(8) as illustrated in (5c) are set.

(5d) is an example where N=9, Nfix=4, Pfix=0.5, G=5/32.

First, the virtual view point P(4) of the reference virtual view point position number Nfix=4 is set at the reference virtual view point position Pfix=0.5, in accordance with the following setting condition: the reference virtual view point position Pfix=0.5 (view point position at the middle of the received left eye image (L image) and the received right eye image (R image)) and the reference virtual view point position number Nfix=4.

Subsequently, the remaining virtual view points P(0) to P(3) and P(5) to P(8) are set with a virtual view point interval G=5/32 from the reference position at which the virtual view point P(4) is set.

With this processing, nine virtual view point positions P(0) to P(8) as illustrated in (5d) are set.

2. Second Embodiment

Embodiment in which Determining Processing of Virtual View Point Positions is Executed on the Basis of Appropriate Amount of Parallax and Image Weight Subsequently, an embodiment in which determining processing of virtual view point positions is executed on the basis of appropriate amount of parallax and an image weight will be explained as the second embodiment of an image processing apparatus of the present disclosure.

In this second embodiment, overall processing sequence is executed according to the flow as illustrated in FIG. 1 explained in the first embodiment above.

The determining processing of the virtual view point positions executed in step S102 in the flowchart as illustrated in FIG. 1 is processing different from the first embodiment explained above.

Figure 14:
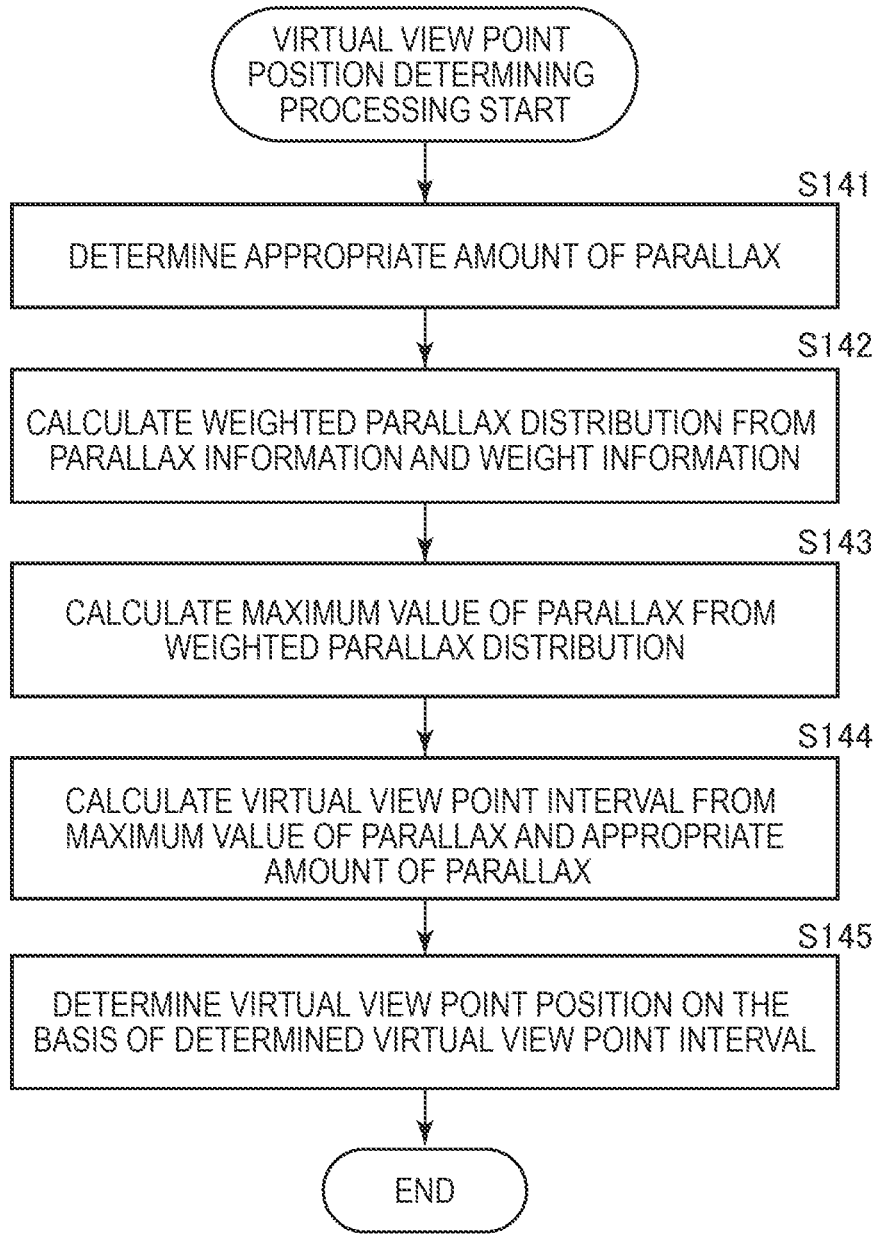
FIG. 14 is a figure illustrating a flowchart for explaining an example of processing of virtual view point position determining processing sequence executed by an image processing apparatus.

FIG. 14 is a flowchart for explaining an example of detailed sequence of virtual view point position determining processing according to this second embodiment.

First, the virtual view point position determining processing sequence according to the present embodiment will be explained with reference to the flow of FIG. 14, and thereafter, details of processing of each step will be explained in order.

First, an image processing apparatus determines an appropriate amount of parallax in step 141. Although specific processing will be explained later, the appropriate amount of parallax is determined in view of, for example, fusional parallax amount or crosstalk allowable amount.

Subsequently, in step S142, weighted parallax distribution is calculated on the basis of weight information and parallax information calculated from a received left eye image (L image) and a received right eye image (R image).

The weight information is information indicating image weight in units of image regions included in an image, and, for example, the weight information is information in which larger weights are set in image regions that are likely to attract attention of an observer, which are, more specifically, a central portion of an image and a facial image region of a person, the details of which will be explained later.

On the basis of the above information, the weighted parallax distribution information is calculated.

Subsequently, in step S143, the maximum value of parallax is calculated by applying the weighted parallax distribution information calculated in step S142. This is a value corresponding to the maximum value of parallax set in the virtual view point image. The details of the calculation processing will be explained later.

Subsequently, in step S144, a virtual view point interval (G) is calculated using the maximum value of parallax calculated in step S143 and the appropriate amount of parallax determined in step S141.

Finally, in step S145, virtual view point positions are determined by applying the virtual view point interval (G) determined in step S144.

Hereinafter, the details of each of the above processing will be explained with reference to the drawings.

(S141: Determining Processing of the Appropriate Amount of Parallax)

First, an example of determining processing of the appropriate amount of parallax executed in step S141 will be explained.

The appropriate amount of parallax is determined in view of, for example, the fusional parallax amount and the crosstalk allowable amount.

The fusional parallax amount is corresponds to the limitation of the amount of parallax which allows observation of a stereoscopic image where the LR images set with the parallax are observed, and the appropriate amount of parallax can be set as an amount of parallax half the fusional parallax amount, for example.

The fusional parallax amount is a value calculated from the size of a display, a distance between an observer and the display, a distance between both eyes, and the like. For example, this is set as a unique value for the display apparatus, and a value half this value is determined as the appropriate amount of parallax using this fusional parallax amount thus set.

For example, it is assumed as follows. The visual distance between the observer and the display apparatus (display) is a standard visual distance (=third times the height of the display). The screen size of the display in the horizontal direction is 1920 pixels (pixels). The distance between both eyes of the observer is 65 mm (average distance between both eyes of adults. In this case, the fusional parallax amount can be calculated as 114 pixels (pixels), and the appropriate amount of parallax can be calculated as 57 pixels (pixels).

The appropriate amount of parallax can also be determined in view of, for example, the crosstalk allowable amount.

The crosstalk is an error in which the left eye image is observed by the right eye, and the right eye image is observed by the left eye.

A certain crosstalk allowable amount is set, and the amount of parallax with which the crosstalk is equal to or less than the crosstalk allowable amount is set as the appropriate amount of parallax.

As described above, the appropriate amount of parallax is determined in view of any one of the fusional parallax amount and the crosstalk allowable amount or both of them.

(S142: Calculation of Weighted Parallax Distribution)

Subsequently, the details of the calculation processing of the weighted parallax distribution executed in step S142 will be explained.

In other words, the weighted parallax distribution is calculated on the basis of weight information and parallax information calculated from a received left eye image (L image) and a received right eye image (R image).

The weight information is information in which larger weights are set in image regions that are likely to attract attention of an observer, which are, more specifically, a central portion of an image and a facial image region of a person, the details of which will be explained later.

Multiple examples of processing (1) to (3) below for calculating the weighted parallax distribution using the weight information will be explained with reference to FIGS. 15 to 17.

(1) Example of processing where weights are set according to image regions (a larger weight is set in a central region)

(2) Example of processing where weights are set according to subjects (a larger weight is set in a person region)

(3) Example of processing in which both of processing of (1) and (2) explained above are combined First, with reference to FIG. 15, in (1) example of processing where weights are set according to image regions (a larger weight is set in a central region), the example of processing for calculating this weighted parallax distribution will be explained.

Figure 15:
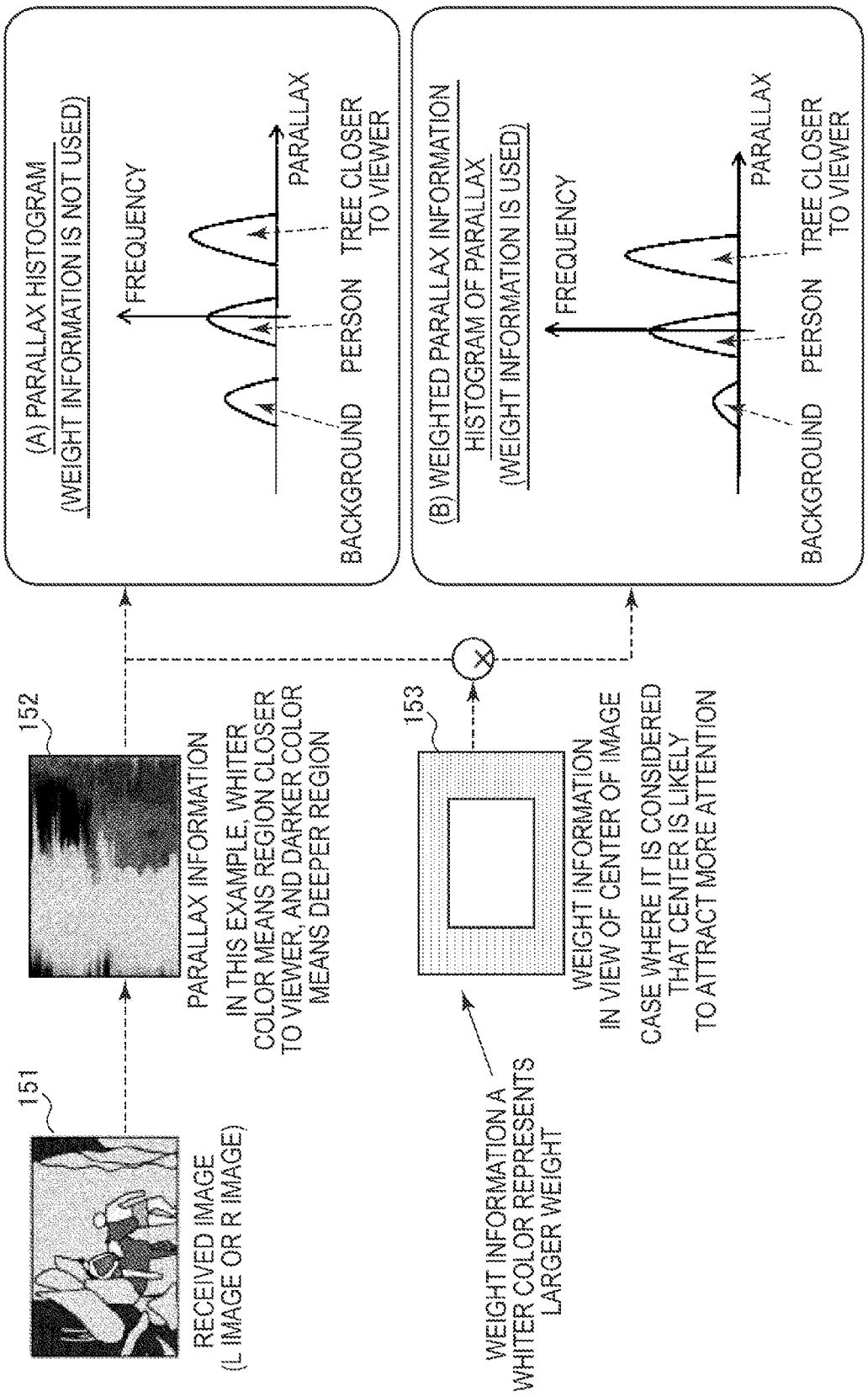
FIG. 15 is a figure for explaining an example of generating processing of weighted parallax distribution to which weight information is applied.

A received image 151 as illustrated in FIG. 15 is an original left eye image (L image) or an original right eye image (R image). The parallax information 152 is parallax information obtained using the original left eye image (L image) and the original right eye image (R image).

A parallax histogram as illustrated in FIG. 15 (A) is a histogram of the parallax information of the parallax information 152. In the histogram, the horizontal axis denotes the value of parallax, and the vertical axis denotes the frequency.

The histogram of FIG. 15(A) is simplified, but subjects in the image include a tree, a person, and a background. The histogram of FIG. 15(A) is a histogram reflecting data corresponding to the parallaxes (corresponding to subject distances).

It is understood that the parallaxes (subject distances) are set such that a subject closest to a camera is the "tree", a subject subsequently close thereto is the "person", and a subject subsequently close thereto is the "background".

In the present embodiment, the parallax information is corrected using predetermined weight information.

In the example as illustrated in FIG. 15, correction is executed on the basis of weights according to image regions, i.e., weight information set such that a higher weight is set in a central region of an image is set, and a weighted parallax distribution (parallax histogram) having a distribution as illustrated in FIG. 15 (B) is generated.

For example, weight information A 153 as illustrated in FIG. 15 is used as the weight information in which weights are set according to image regions.

As illustrated in the figure, the weight information A 153 is an image in which weights according to image regions are indicated using brightness.

This indicates that a higher weight is set in a central region having high brightness, and a lower weight is set in a peripheral region having low brightness.

By multiplying the parallax information 152 by this weight information A 153 in units of corresponding pixels, the parallax histogram is calculated as the weighted parallax distribution illustrated in FIG. 15 (B).

As illustrated in FIG. 15 (B), the "person" and the "tree" exists in a central region of the image, and therefore, the value of frequency increases, whereas most of the "background" exist in a peripheral region, the value of frequency decreases. As described above, the image processing apparatus generates, for example, weighted parallax information in which weights are set according to image regions.

Subsequently, with reference to FIG. 16, in (2) example of processing where weights are set according to subjects (a larger weight is set in a person region), the example of processing for calculating this weighted parallax distribution will be explained.

Figure 16:
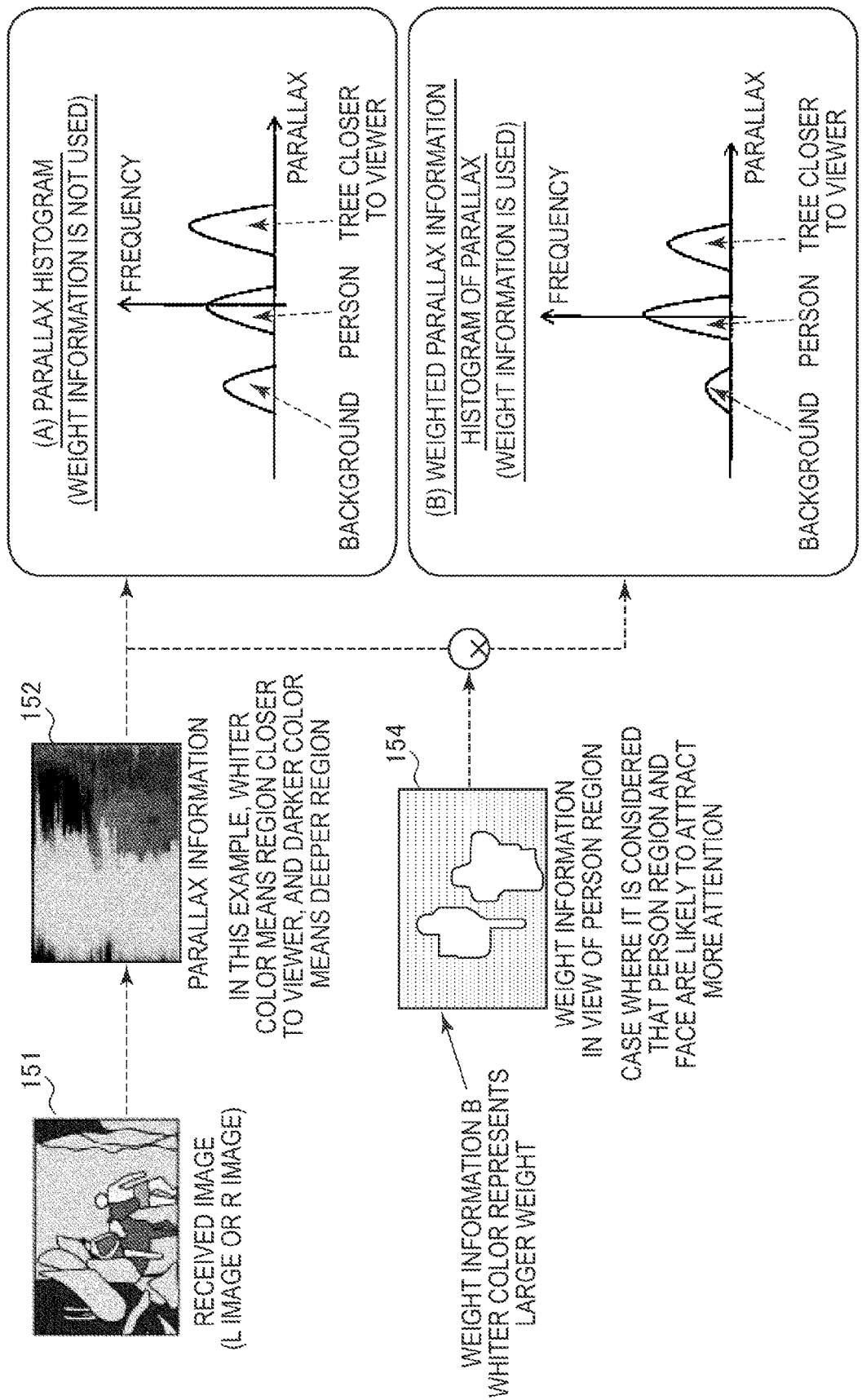
FIG. 16 is a figure for explaining an example of generating processing of weighted parallax distribution to which weight information is applied.

A received image 151 as illustrated in FIG. 16 is an original left eye image (L image) or an original right eye image (R image). The parallax information 152 is parallax information obtained using the original left eye image (L image) and the original right eye image (R image).

A parallax histogram as illustrated in FIG. 16 (A) is a histogram of the parallax information of the parallax information 152 like that in FIG. 15. In the histogram, the horizontal axis denotes the value of parallax, and the vertical axis denotes the frequency In the present embodiment, correction is executed this parallax information on the basis of weights according to subjects, i.e., for example, weight information set such that a higher weight is set in a person region of an image is set, and a weighted parallax distribution (parallax histogram) having a distribution as illustrated in FIG. 16 (B) is generated.

For example, weight information B 154 as illustrated in FIG. 16 is used as the weight information in which weights are set according to subject regions.

As illustrated in the figure, the weight information B 154 is an image in which weights according to subject regions are indicated using brightness.

In this example, a weight of a region where subject=person is high, and this indicates that a weight of a region where subject≠person is low.

By multiplying the parallax information 152 by this weight information B 154 in units of corresponding pixels, the parallax histogram is calculated as the weighted parallax distribution illustrated in FIG. 16 (B).

As illustrated in FIG. 16 (B), the value of frequency of the "person" increases, whereas the values of frequencies of the "tree" and the "background" the decrease. The image processing apparatus generate weighted parallax information in which weights are set according to subjects as described above.

Figure 17:
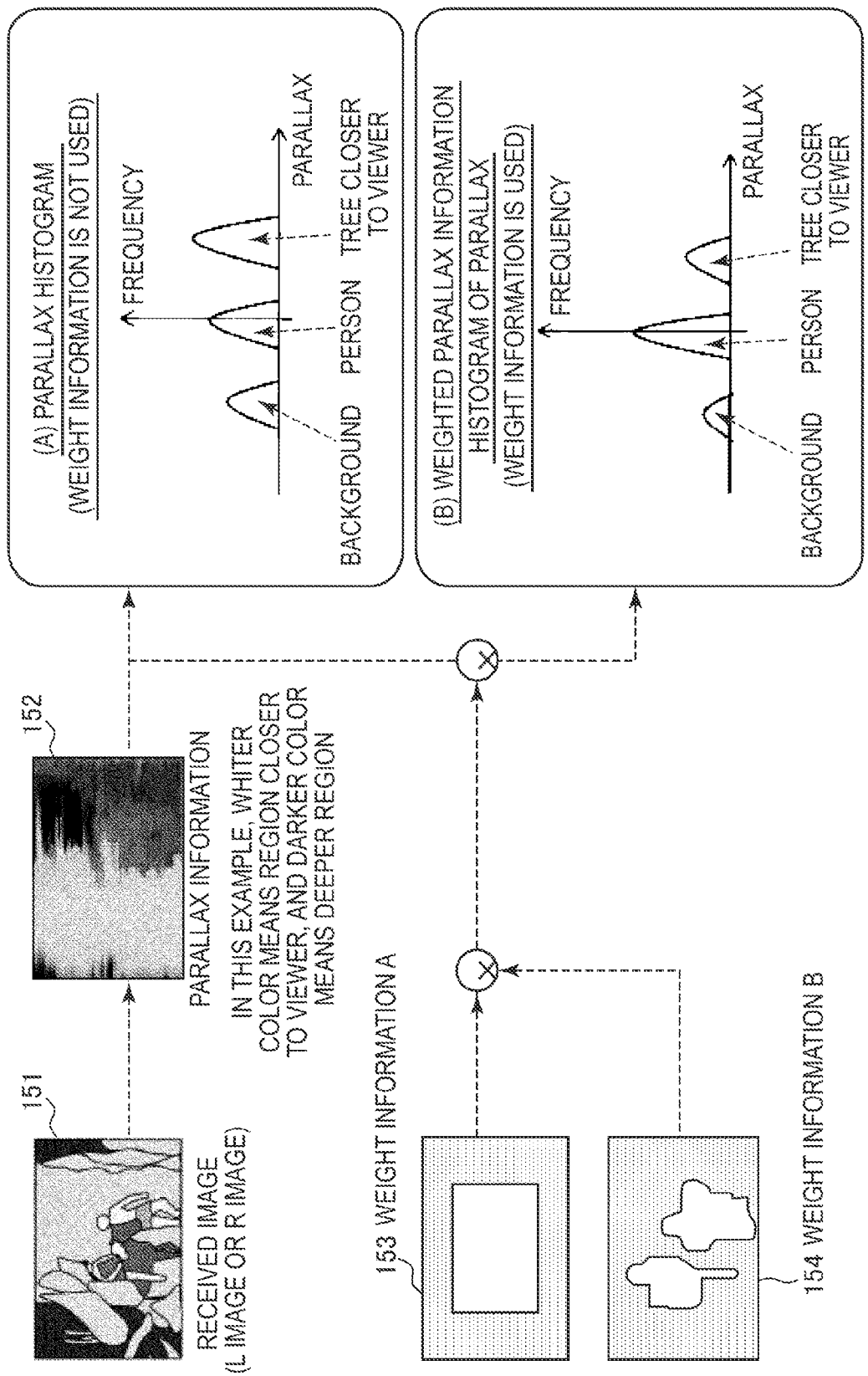
FIG. 17 is a figure for explaining an example of generating processing of weighted parallax distribution to which weight information is applied.

FIG. 17 is an example of processing using both of the weight information corresponding to image regions and weight information corresponding to subjects explained with reference to FIG. 15.

First, the weight information A 153 including the weight information corresponding to the image regions is multiplied by the weight information B 154 corresponding to the subjects, whereby a weight image is generated by combining two pieces of weight information, and thereafter, multiplication by the parallax information 152 (multiplication of corresponding pixels) is executed.

With this processing, the parallax histogram is calculated as the weighted parallax distribution illustrated in FIG. 17 (B).

As illustrated in FIG. 17 (B), the value of frequency of the "person" increases, whereas the values of frequencies of the "tree" and the "background" decrease. The image processing apparatus generate weighted parallax information in which weights are set according to subjects as described above.

Multiple examples of calculation processing of weighted parallax distributions have been explained with reference to FIGS. 15 to 17.

This calculation processing of the weighted parallax distributions will be explained.

Parallax information, weight information, a weighted parallax distribution are expressed as follows.

D (x, y): parallax information
W (x, y): weight information
H(d): weighted parallax distribution However, D (x, y), W (x, y) represent the values of parallax and weight at pixel position (x, y) in the image.

It should be noted that d in H(d) means the value of parallax, and H(d) means the number of pixels having the parallax d.

Under this conditional setting, the weighted parallax distribution H(d) can be obtained using the following calculation expression.

$$H(d) = \Sigma_{x,y}\{W(x,y) * \delta(d - D(x,y))\}$$

However, $\delta(x)$ is a function that returns 1 when x is zero and returns 0 in the other cases.

In the present embodiment, the image processing apparatus calculates the weighted parallax distribution with the calculation processing according to the above expression in step S142 in the flowchart as illustrated in FIG. 14.

(Step S143: Calculation of the Maximum Value of Parallax)

Subsequently, the details of the calculation processing of the maximum value of parallax executed in step S143 will be explained.

This processing is processing in which the weighted parallax distribution information calculated in step S142 is applied and the maximum value of parallax is calculated, and is processing in which the maximum value of parallax set in the virtual view point image is calculated.

The details of the calculation processing of the maximum value of parallax (Dabsmax) will be explained.

The parameters are defined as follows.

H(d): weighted parallax distribution (calculation value in step S142)

O(d): parallax accumulative distribution (calculated from H(d))

S: summation of weighted parallax distributions (calculated from H(d))

th: threshold value applied to the maximum parallax calculation processing (user input value or preset value)

Dmax: the maximum value of parallax (calculated from th)
Dmin: the minimum value of parallax (calculated from th)
Dabsmax: the maximum value of parallax (absolute value) (output value)

It should be noted that $O(d) = \Sigma_{i=min\ (D)\ to\ d}\{(i)\}$ holds, and Dmin=$O^{-1}$ (th) Dmax=$O^{-1}$ (S-th) holds.

FIG. 18A is a figure illustrating an example of data showing relationship between the parallax d and the weighted parallax distribution H(d).

FIG. 18B is a figure illustrating examples of values of the following data, which are shown in the relationship data of the parallax d and the parallax accumulative distribution O(d).

Summation of weighted parallax distributions: S

Threshold value: th

The maximum value of parallax: Dmax

The minimum value of parallax: Dmin

Further, S-th,

Examples of the data are shown.

The maximum value of parallax (Dabsmax) which is output can be calculated by the following expression.

$$Dabsmax = max(abs(Dmax), abs(Dmin))$$

In step S143, the maximum value of parallax (Dabsmax) is calculated according to the above expression.

(Step S144: Calculate Virtual View Point Interval)

Subsequently, the calculation processing of the virtual view point interval (G) executed in step S144 will be explained.

In other words, this is processing of calculating the virtual view point interval (G) using the maximum value of parallax calculated in step S143 and the appropriate amount of parallax determined in step S141.

The calculation processing of the virtual view point interval (G) will be explained.

The parameters are defined as follows.

E: difference between a virtual view point image number which is input to the left eye and a virtual view point image number which is input to the right eye (value determined according to display method)

$D_F$: the fusional parallax amount (value according to a display apparatus (preset value))

$D_E$: fusional parallax amount between adjacent virtual view points ($D_E = D_F/E$)

$D_C$: crosstalk allowable amount between adjacent virtual view points (value according to a display apparatus (preset value))

$D_A$: appropriate amount of parallax (calculation value of step S141)

Dabsmax: the maximum value of parallax (absolute value) (calculation value of step S143)

G: virtual view point interval (output value)

It should be noted that $D_E = D_F/E$ and $D_A = min(D_C, D_E)$ hold.

At this occasion, the virtual view point interval (G) can be calculated according to the following expression.

$$G = Dabsmax/D_A$$

In step S144, the virtual view point interval (G) is calculated according to the above expression.

(Step S145: Determination of Virtual View Point Position)

Subsequently, the determining processing of the virtual view point positions executed in step S145 will be explained.

This determining processing of the virtual view point positions is the same processing as the processing of step S123 of the flow of FIG. 5 of the first embodiment explained above. More specifically, this is the same processing as the processing explained with reference to FIGS. 9 to 13.

Various settings are made, as explained with reference to FIGS. 9 to 13, in accordance with the following values: not only the virtual view point interval (G) calculated in step S144 but also the total number of virtual view points N determined according to the display apparatus (display), the reference virtual view point position (Pfix) determined according to, e.g., user input, and the reference virtual view point position number (Nfix).

3. Third Embodiment

Embodiment in which Determining Processing of Virtual View Point Positions is Executed on the Basis of Image Quality, Appropriate Amount of Parallax, and Image Weight Subsequently, the determining processing of the virtual view point positions in view of the image quality explained in the first embodiment explained above, the determining processing of the virtual view point positions in view of the appropriate amount of parallax and the image weight explained as the second embodiment, and an example of processing of a combination thereof will be explained as the third embodiment of processing executed by an image processing apparatus of the present disclosure.

That is, this is processing for determining the virtual view point positions in view of all of the following items:

the image qualities of the virtual view point images, the appropriate amount of parallax, the image weight.

In this third embodiment, overall processing sequence is executed according to the flow as illustrated in FIG. 1 explained in the first embodiment above.

The determining processing of the virtual view point positions executed in step S102 in the flowchart as illustrated in FIG. 1 is processing different from the first embodiment explained above.

Figure 19:
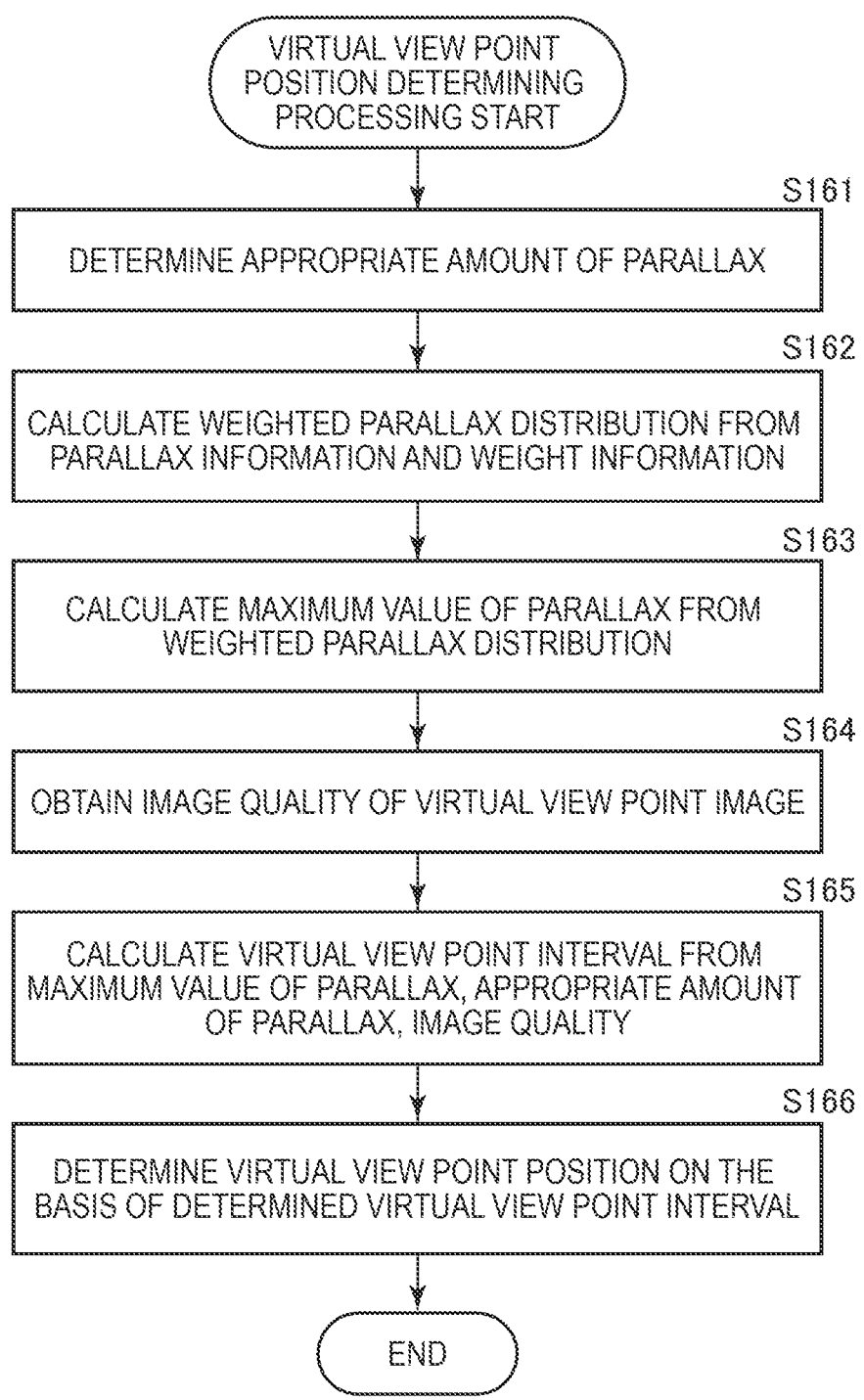
FIG. 19 is a figure illustrating a flowchart for explaining an example of processing of virtual view point position determining processing sequence executed by an image processing apparatus.

FIG. 19 is a flowchart for explaining an example of detailed sequence of virtual view point position determining processing according to this third embodiment.

The virtual view point position determining processing sequence according to the present embodiment will be explained with reference to the flow of FIG. 19.

The processing of steps S161 to S163 in the flow as illustrated in FIG. 19 is the same processing as the processing of steps S141 to S143 in the flow as illustrated in FIG. 14 explained in the second embodiment.

In other words, in step S161, the appropriate amount of parallax is determined. More specifically, for example, the appropriate amount of parallax is determined in view of, for example, fusional parallax amount or crosstalk allowable amount.

Subsequently, in step S162, weighted parallax distribution is calculated on the basis of weight information and parallax information calculated from a received left eye image (L image) and a received right eye image (R image).

This processing is the processing explained with reference to FIGS. 15 to 17 above.

Subsequently, in step S163, the maximum value of parallax is calculated by applying the weighted parallax distribution information calculated in step S162.

This processing is the same processing as the processing of steps S141 to S143 in the flow as illustrated in FIG. 14 explained in the second embodiment.

The subsequent processing in step S164 is the same processing as the processing of step S121 in the flow as illustrated in FIG. 5 explained in the first embodiment.

In other words, calculation of the image qualities of the virtual view point images is executed. This processing is the processing explained with reference to FIGS. 6 to 8 above.

In step S165 subsequent thereto, the virtual view point interval is calculated by applying all of the following items:

the appropriate amount of parallax obtained in step S161, the maximum value of parallax obtained in step S163, and the image quality obtained in step S164.

This calculation processing of the virtual view point interval will be explained.

The parameters are defined as follows.

E: difference between a virtual view point image number which is input to the left eye and a virtual view point image number which is input to the right eye (value determined according to display method)

$D_F$: the fusional parallax amount (value according to a display apparatus (preset value))

$D_E$: fusional parallax amount between adjacent virtual view points ($D_{E=DF}/E$)

$D_C$: crosstalk allowable amount between adjacent virtual view points (value according to a display apparatus (preset value))

$D_A$: appropriate amount of parallax (calculation value of step S161)

Dabsmax: the maximum value of parallax (absolute value) (calculation value of step S163)

G: virtual view point interval (output value)

Q: virtual view point image quality evaluation value (value calculated in step S164)

Q': virtual view point interval calculation parameter (user input)

It should be noted that $D_E=D_F/E$ and $D_A=\min(D_E, D_E)$ hold.

At this occasion, the virtual view point interval (G) can be calculated according to the following expression.

$$G=\{D\max/D_A\}*\{Q/Q'\}$$

In step S165, the virtual view point interval (G) is calculated according to the above expression.

In the final step of S166, virtual view point positions are determined by applying the virtual view point interval (G) determined in step S165.

This determining processing of the virtual view point positions is the same processing as the processing of step S123 of the flow of FIG. 5 of the first embodiment explained above. More specifically, this is the same processing as the processing explained with reference to FIGS. 9 to 13.

Various settings are made, as explained with reference to FIGS. 9 to 13, in accordance with the following values: not only the virtual view point interval (G) calculated in step S165 but also the total number of virtual view points N determined according to the display apparatus (display), the reference virtual view point position (Pfix) determined according to, e.g., user input, and the reference virtual view point position number (Nfix).

4. Fourth Embodiment

Example of Processing for Determining Virtual View Point Positions of Non-Regular Intervals Subsequently, an example of processing for determining virtual view point positions of a non-regular interval will be explained as the fourth embodiment executing an image processing apparatus of the present disclosure.

In this fourth embodiment, overall processing sequence is executed according to the flow as illustrated in FIG. 1 explained in the first embodiment above.

The determining processing of the virtual view point positions executed in step S102 in the flowchart as illustrated in FIG. 1 is processing different from the first embodiment explained above.

Figure 20:
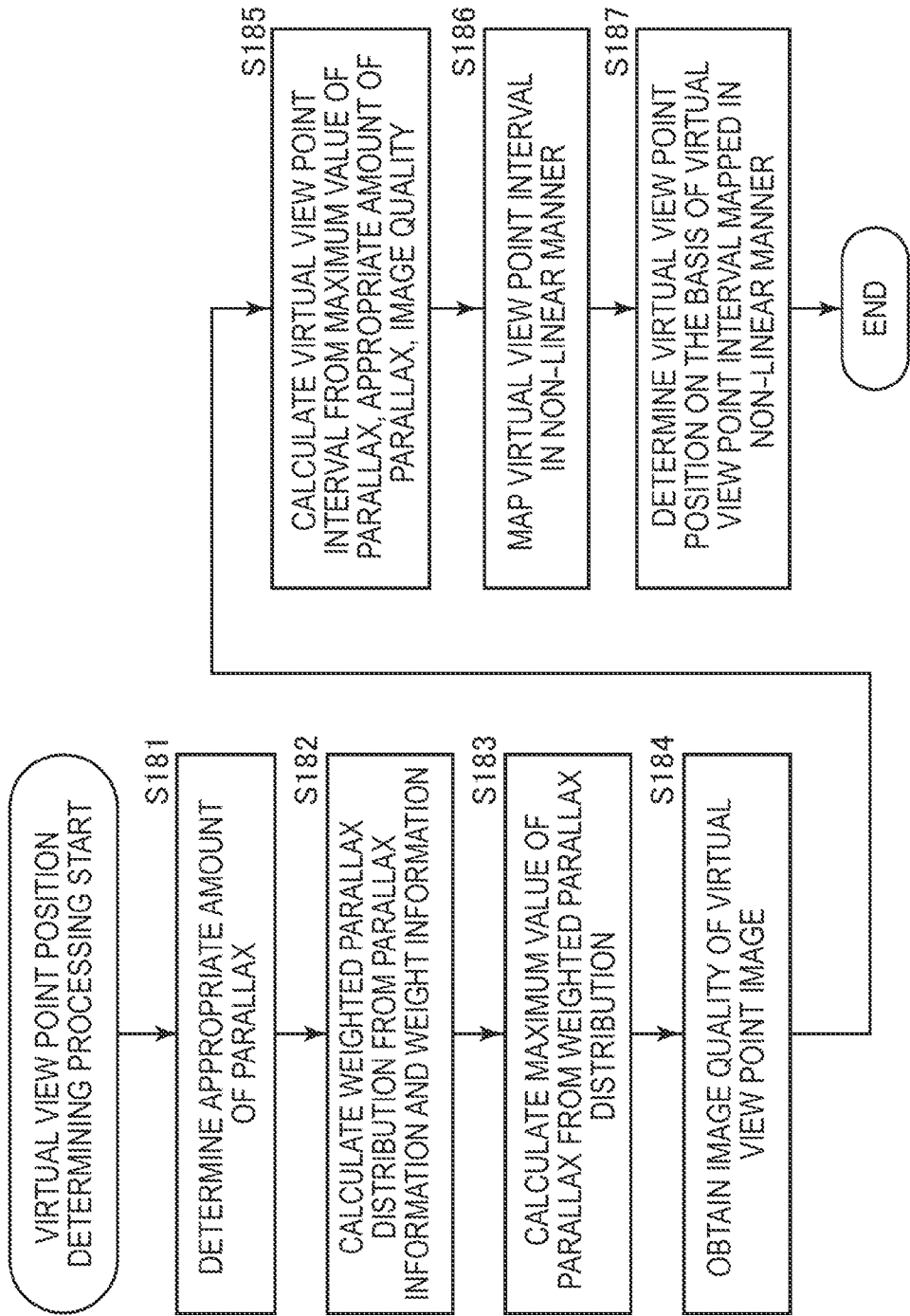
FIG. 20 is a figure illustrating a flowchart for explaining an example of processing of virtual view point position determining processing sequence executed by an image processing apparatus.

FIG. 20 is a flowchart for explaining an example of detailed sequence of virtual view point position determining processing according to this fourth embodiment.

The virtual view point position determining processing sequence according to the present embodiment will be explained with reference to the flow of FIG. 20.

The processing of steps S181 to S185 is the same processing as the processing of steps S161 to 165 of the flow as illustrated in FIG. 19 explained in the third embodiment explained above.

In step S185, the virtual view point interval is calculated by applying all of the following items:
the appropriate amount of parallax obtained in step S181, the maximum value of parallax obtained in step S183, and the image quality obtained in step S184.

Subsequently, in step S186, the virtual view point interval (G) obtained in step S185 is mapped in a non-linear manner. A specific example of this processing will be explained.

The parameters are defined as follows.

i: view point number

G: virtual view point interval

G(i): virtual view point interval after mapping

Figure 21:
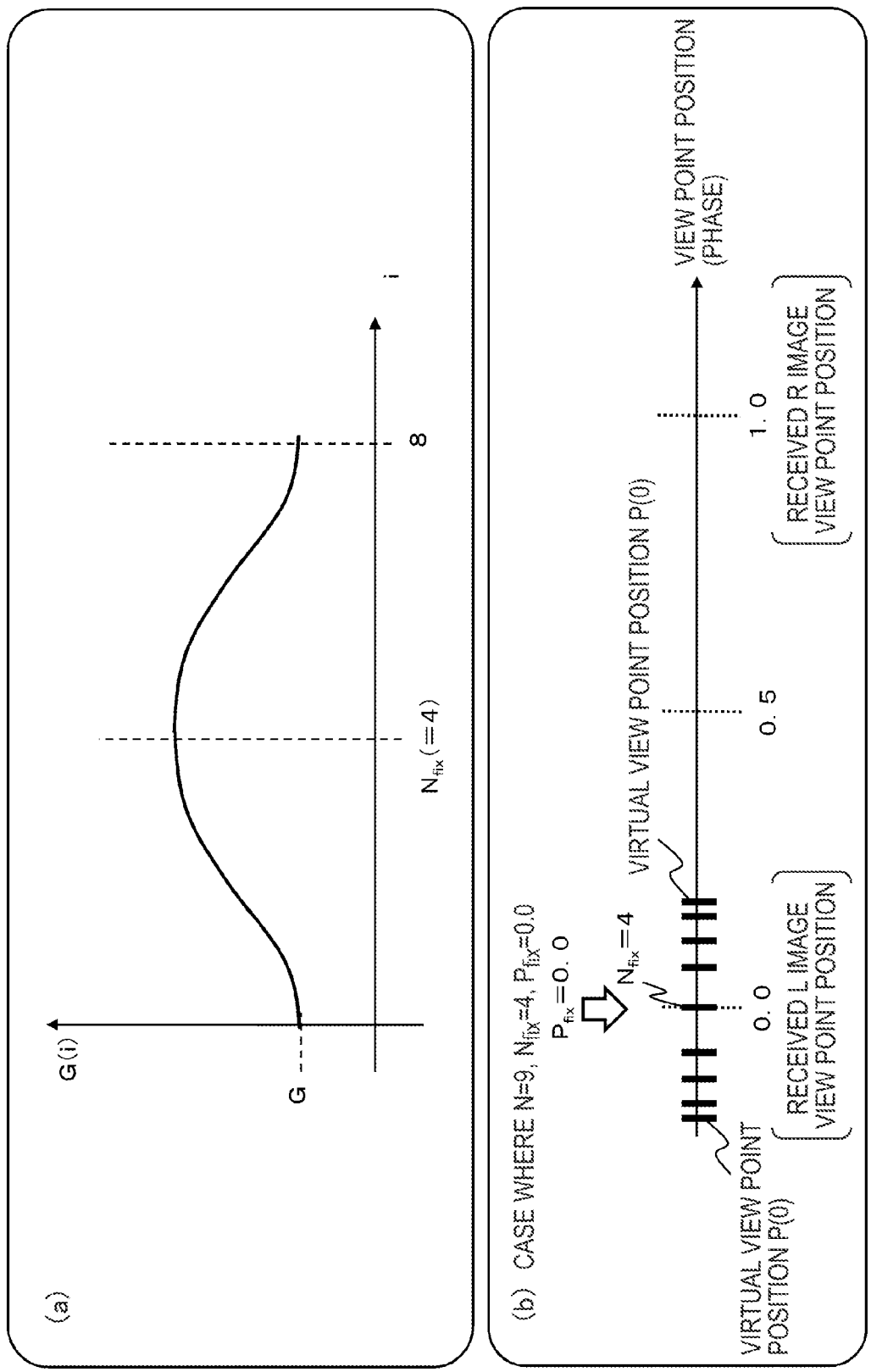
FIGS. 21A and 21B are figures for explaining an example of determining processing virtual view point positions having virtual view point intervals of non-regular intervals.

A function for mapping the virtual view point interval in accordance with the view point number (i) in a non-linear manner is, for example, a function as illustrated in FIG. 21A. The function is stored to a memory in the image processing apparatus in advance, and this is applied.

Subsequently, in step S187, the virtual view point positions are determined using the virtual view point interval G(i) determined in step S186.

This determining processing of the virtual view point positions is the same processing as the processing of step S123 of the flow of FIG. 5 of the first embodiment explained above. More specifically, this is the same processing as the processing explained with reference to FIGS. 9 to 13.

Various settings are made in accordance with the following values: not only the virtual view point interval (G(i)) calculated in step S186 but also the total number of virtual view points N determined according to the display apparatus (display), the reference virtual view point position (Pfix) determined according to, e.g., user input, and the reference virtual view point position number (Nfix).

However, in the processing explained with reference to FIGS. 9 to 13, all the virtual view point intervals are the same, but in this example, for example, as illustrated in FIG. 21B, each virtual view point interval is set differently. In other words, they are set as intervals determined by G(i).

The example shown in FIG. 21B shows an example where N=9, Bfix=4, Pfix=0.0.

As described above, the virtual view point image generating unit of the image processing apparatus according to the present embodiment determines a first virtual view point position by means of processing in view of at least one of the image qualities of the virtual view point images, the appropriate amount of parallax, and the image weights according to image regions, determines a second virtual view point position of a non-regular interval by the non-linear mapping processing performed on the determined first virtual view point position, and generates a virtual view point image corresponding to the determined second virtual view point position of the non-regular interval.

5. Fifth Embodiment

Example of Processing for Generating Virtual View Point Images Using Shift Processing Subsequently, an example of processing of generating virtual view point images using shift processing will be explained as the fifth embodiment of an image processing apparatus of the present disclosure.

Figure 22:
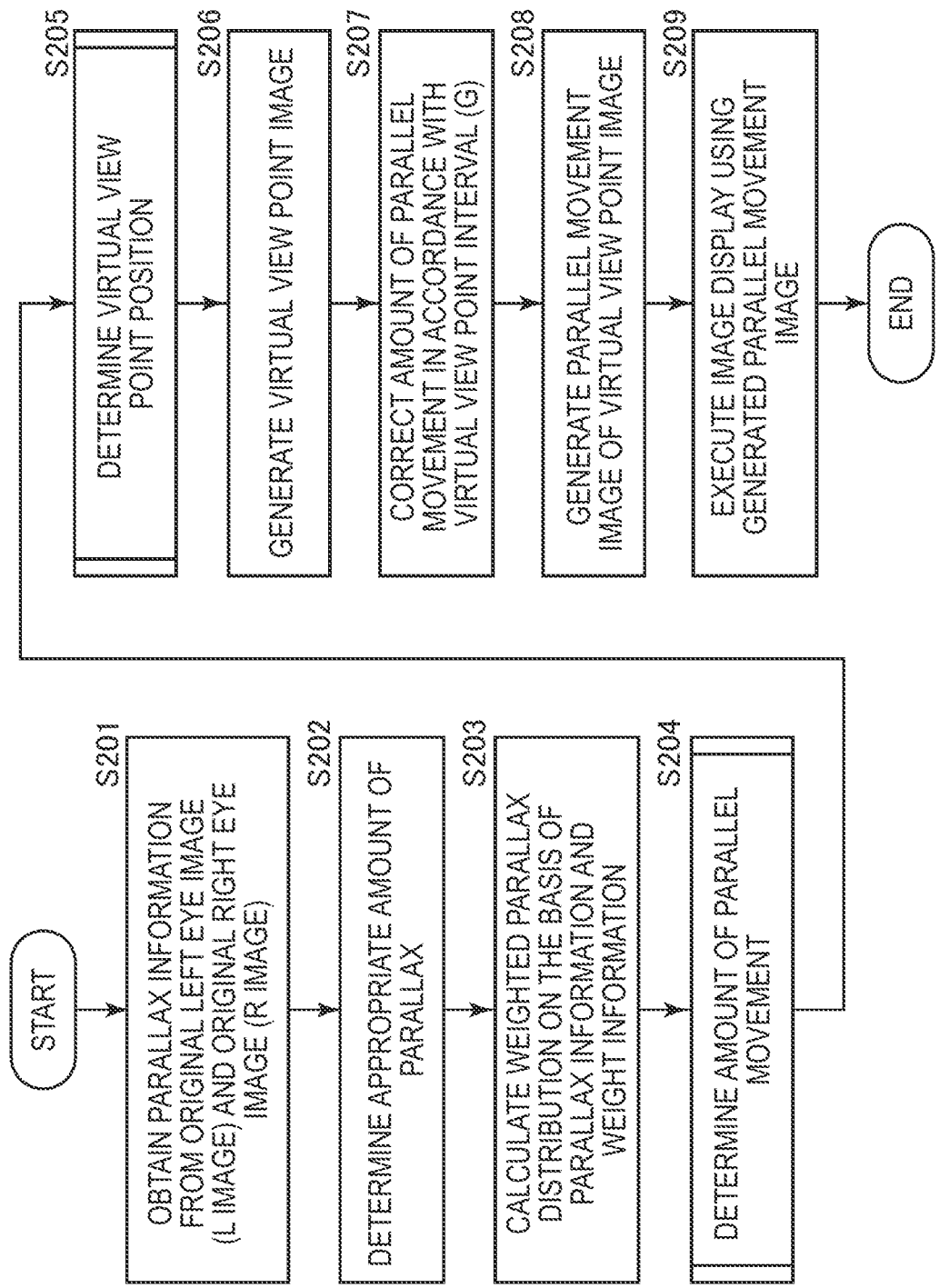
FIG. 22 is a figure illustrating a flowchart explaining a processing sequence of an example of processing for generating virtual view point images using shift processing.

A processing sequence of an image processing apparatus of the present embodiment will be explained with reference to the flowchart as illustrated in FIG. 22.

In step S201, the image processing apparatus receives an original left eye image (L image) and an original right eye image (R image) for three-dimensional image display, and obtains parallax information using these received LR images.

In other words, parallax information is obtained by using standard LR images with which an optimum three-dimensional image is observed when observed from a standard visual position with respect to a display displaying a three-dimensional (3D) image.

Subsequently, in step S202, the appropriate amount of parallax is determined.

This processing is the same processing as the processing of step S141 in the flowchart as illustrated in FIG. 14 explained as the second embodiment above. For example, determination is made in view of the fusional parallax amount and the crosstalk allowable amount.

Subsequently, in step S203, weighted parallax distribution is calculated on the basis of weight information and parallax information calculated from a received left eye image (L image) and a received right eye image (R image).

This processing is the same processing as the processing of step S142 in the flowchart as illustrated in FIG. 14 explained as the second embodiment above.

The weight information is information indicating image weight in units of image regions included in an image, and, for example, the weight information is information in which larger weights are set in image regions that are likely to attract attention of an observer, which are, more specifically, a central portion of an image and a facial image region of a person, the details of which will be explained later.

The weighted parallax distribution is calculated by the same processing as the processing explained with reference to FIGS. 15 to 17 above.

Subsequently, in step S204, the determining processing of the amount of parallel movement (the amount of shift) is executed.

This amount of parallel movement is an amount of parallel movement of parallax distribution for moving the parallax distribution in a direction in which the parallax increases or in a direction in which the parallax decreases.

The calculation processing of the amount of parallel movement of the parallax distribution will be explained.

The parameters are defined as follows.

H(d): weighted parallax distribution (obtained value in step S203)

O(d): parallax accumulative distribution (calculated from H(d))

S: summation of parallax distribution (calculated from H(d))

Davg: average value of parallax

Dcenter: median value of parallax

Dmax: the maximum value of parallax

Dmin: the minimum value of parallax

Shift

It should be noted that the following expressions hold: $O(d)=\Sigma_{i=min(D) \, to \, d}\{H(i)\}$, $Dmin=O^{-1}(th)$, $Dmax=O^{-1}(S-th)$, $Dcenter=(Dmax-Dmin)/2$, $Davg=average(H(d))$.

FIG. 23A is a figure illustrating an example of data showing relationship between the parallax d and the weighted parallax distribution H(d).

FIG. 23B is a figure illustrating examples of values of the following data, which are shown in the relationship data of the parallax d and the parallax accumulative distribution O(d).

Summation of weighted parallax distribution: S

Threshold value: th

The maximum value of parallax: Dmax

The minimum value of parallax: Dmin

Further, S-th,

Examples of the data are shown.

The amount of parallel movement (Shift) which is output can be calculated by the following expression.

$$Shift = -Davg$$

Alternatively, $$Shift = -Dcenter$$

In step S204, the amount of parallel movement (Shift) of the weighted parallax distribution is calculated according to the above expression.

In step S205 subsequent thereto, the determining processing of the virtual view point positions is performed.

The detailed sequence of this processing will be explained with reference to the flowchart of FIG. 24.

First, in step S221, correction of the weighted parallax distribution, i.e., parallel movement, is performed on the basis of the amount of parallel movement obtained in step S204.

Figure 25:
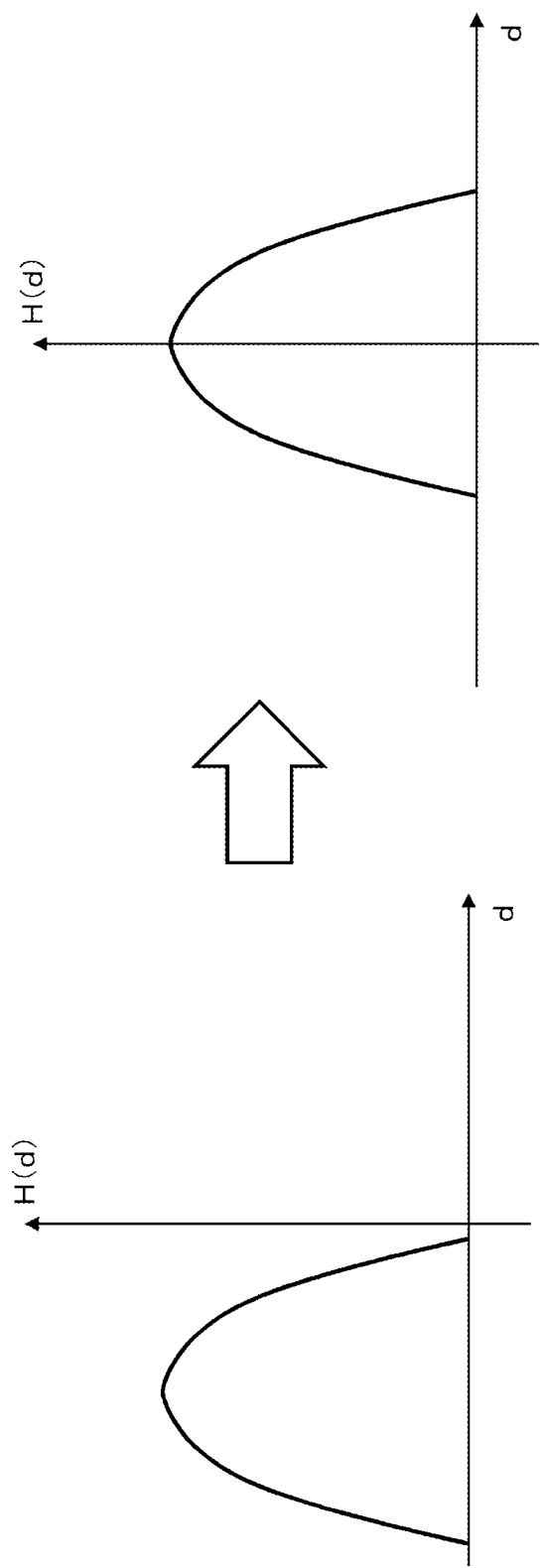
FIG. 25 is a figure explaining an example of a weighted parallax distribution and a corrected weighted parallax distribution in which correction of parallel movement has been done.

More specifically, as illustrated in FIG. 25, (a) the weighted parallax distribution data are moved in parallel on the basis of the amount of parallel movement obtained in step S203, and (b) corrected weighted parallax distribution data are generated.

This parallax distribution correction processing can be expressed as the following expression.

The parameters are defined as follows.

Shift: the amount of parallel movement (calculated in step S204)

(d): parallax distribution (weighted parallax distribution)

H(d)': correction parallax distribution (corrected weighted parallax distribution)

At this occasion, the corrected weighted parallax distribution[H(d)'] is calculated according to the following expression.

$$H(d)'=H(d-\text{Shift})$$

In step S222 subsequent thereto, the maximum value of parallax is calculated by applying weighted parallax distribution information calculated in step S203. This processing is the same processing as the processing of steps S143 in the flow as illustrated in FIG. 14 explained in the second embodiment.

The processing of step S223 subsequent thereto is the same processing as the processing of step S121 in the flow of FIG. 5 explained in the first embodiment.

In other words, calculation of the image qualities of the virtual view point images is executed. This processing is the processing explained with reference to FIGS. 6 to 8 above.

In step S224 subsequent thereto, the virtual view point interval is calculated by applying all of the following items:

the appropriate amount of parallax obtained in step S202, the maximum value of parallax obtained in step S222, and the image quality obtained in step S223.

This processing is the same processing as the processing of steps S165 in the flow as illustrated in FIG. 19 explained in the third embodiment above.

In the final step of S225, virtual view point positions are determined by applying the virtual view point interval (G) calculated in step S224.

This determining processing of the virtual view point positions is the same processing as the processing of step S123 of the flow of FIG. 5 of the first embodiment explained above. More specifically, this is the same processing as the processing explained with reference to FIGS. 9 to 13.

Figure 24:
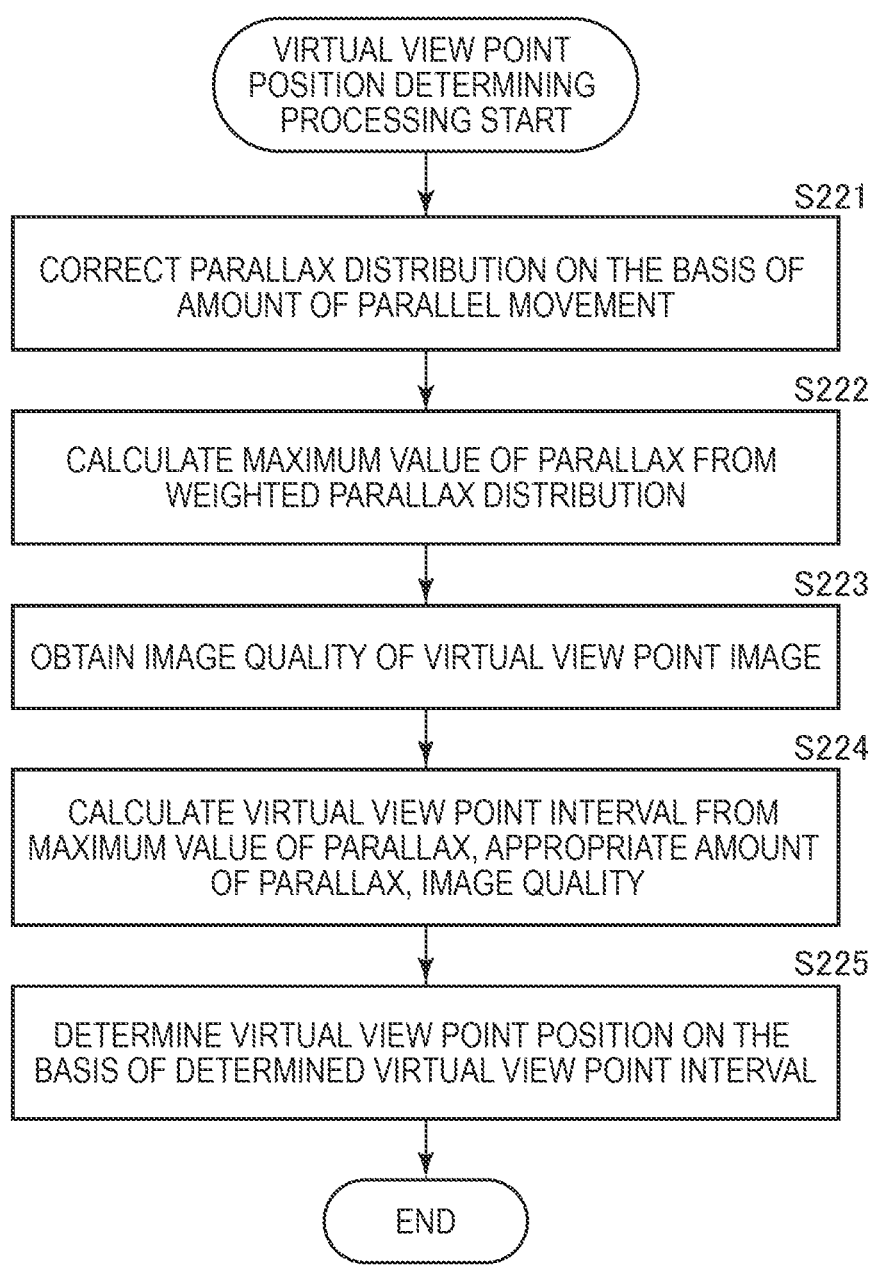
FIG. 24 is a figure illustrating a flowchart for explaining an example of processing of virtual view point position determining processing sequence executed by an image processing apparatus.

The determining processing of the virtual view point positions of step S205 in the flow of FIG. 22 is performed in accordance with steps S221 to S225 in the flow as illustrated in FIG. 24.

Subsequently, the generating processing of virtual view point images is executed in step S205 as illustrated in the flow of FIG. 24.

This processing is the same processing as the processing of steps S103 in the flow as illustrated in FIG. 1 explained in the first embodiment above.

In step S205, images corresponding to images observed from the virtual view point positions determined in step S204 are generated. In other words, the virtual view point images are generated. In step S204, for example, a predetermined number of (for example, 10) virtual view points are determined, and in step S105, virtual view point images corresponding to the virtual view points are generated.

The virtual view point images are generated using the received standard LR images as explained with reference to FIG. 2 above. In other words, they are generated using the original left eye image (L image) and the original right eye image (R image) for three-dimensional image display.

Subsequently, in step S207, the amount of parallel movement is corrected according to the virtual view point interval (G).

Figure 26:
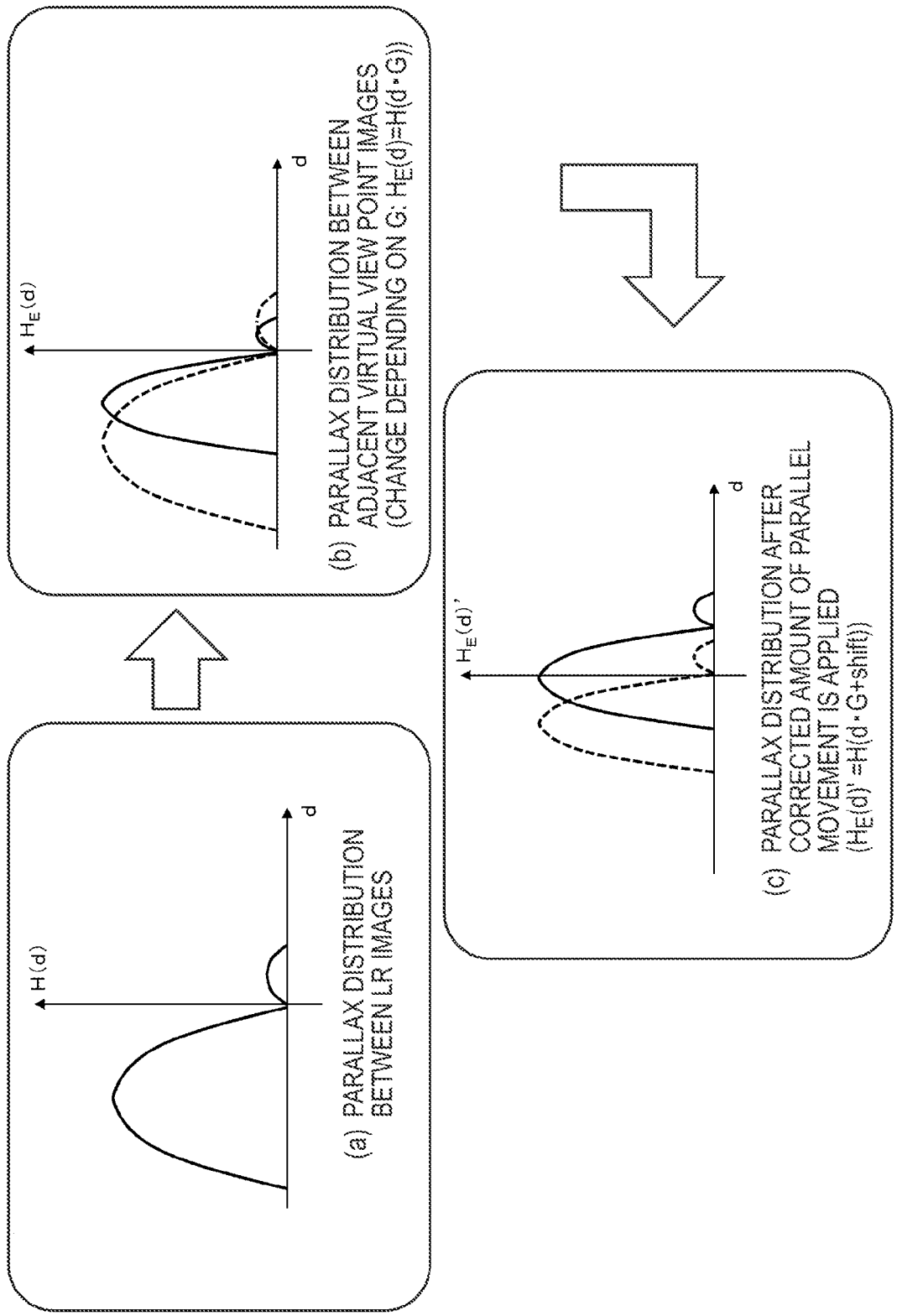
FIG. 26 is a figure for explaining an example of processing of parallel movement of a parallax distribution.

This processing will be explained with reference to FIG. 26.

The parameters are defined as follows.

Shift: the amount of parallel movement (value determined in step S204)

Shift': the amount of parallel movement after correction

G: virtual view point interval (G determined in step S205 (step S224))

Under the setting of the above parameters, the corrected amount of parallel movement Shift' is calculated according to the following expression.

$$-Shift' = Shift * G$$

FIG. 26 shows:

(a) parallax distribution between the received LR images, (b) parallax distribution between adjacent virtual view points (solid line), (c) parallax distribution to which the corrected amount of parallel movement has been applied.

The parallax distribution between adjacent virtual view points as illustrated in (b) is changed depending on the virtual view point interval G. In other words, $H_E(d) = H(d*G)$ holds, and the corrected parallax distribution HE (d)' as illustrated in (c) can be expressed according to the following expression.

$$H_E(d)' = H(d*G + Shift')$$

Subsequently, in step S208, an image moved in parallel of a virtual view point image is generated.

This processing will be explained with reference to FIG. 27.

The parameters are defined as follows.

Shift': the amount of parallel movement after correction (value determined in step S207)

L(i, x, y): the i-th virtual view point image before parallel movement

L(i, x, y)': the i-th virtual view point image after parallel movement

Nfixshift: the number of virtual view point image of reference that is not moved in parallel (user input)

Shift' (i): the amount of parallel movement applied to the i-th virtual view point image It should be noted that (x, y) in L(i, x, y), L(i, x, y)' denotes a pixel position constituting an image, and means a pixel value of each image.

On the basis of the above parameters, the amount of parallel movement [Shift' (i)] applied to the i-th virtual view point image is calculated by the following expression.

$$Shift'(i) = Shift'*(i - Nfixshift))$$

Further, the i-th virtual view point image[L(i, x, y)'] after the parallel movement is calculated b the following expression.

$$L(i,x,y)' = L(i, x + Shift'(i), y)$$

The above expression means that the virtual view point image moved in parallel can be generated by moving the pixel positions of the image in the x direction (horizontal shift).

Figure 27:
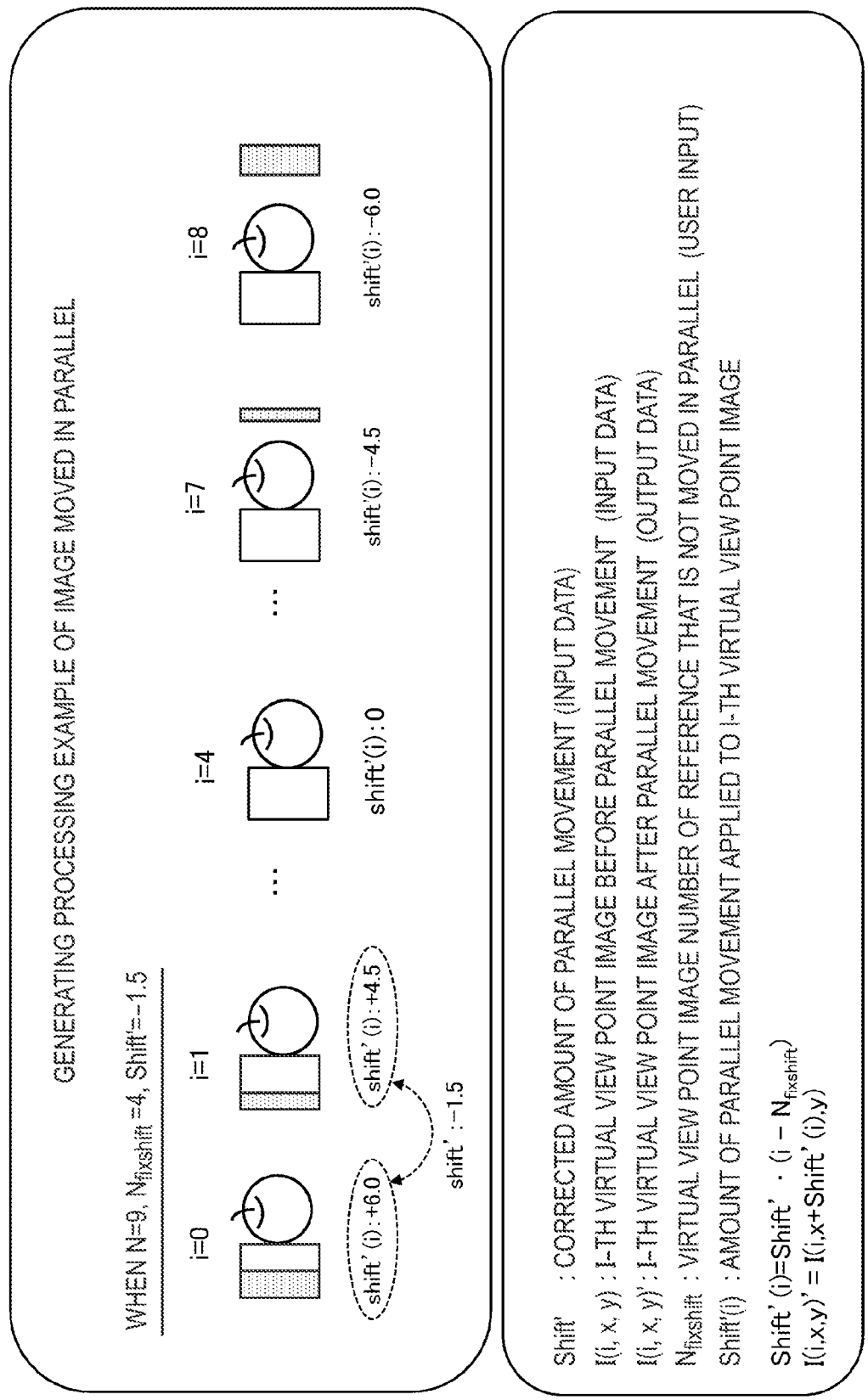
FIG. 27 is a figure for explaining parallel movement processing of an image with regard to an example of virtual view point image generating processing.

The example as illustrated in FIG. 27 is a figure showing an example of execution of parallel movement (shift) processing of each virtual view point image in accordance with the following setting:

N=9,

Nfixshift=4, and

Shift'=1.5.

As described above, the virtual view point image generating unit of the image processing apparatus according to the present embodiment determines virtual view point positions by means of processing in view of at least one of the image qualities of the virtual view point images, the appropriate amount of parallax, and the image weights according to image regions, calculates the amount of parallel movement on the basis of parallax distribution data calculated from the parallax information, executes moving processing of the parallax distribution between the virtual view point images of the respective virtual view point positions on the basis of the amount of parallel movement calculated, and generates virtual view point images reflecting the moving processing result of the parallax distribution data.

In the explanation about the present embodiment explained above, the example of configuration has been explained in which the weighted parallax distribution is generated on the basis of the parallax distribution obtained from the received LR images, and the generated weighted parallax distribution data are processed. However, the following configuration may also be possible: processing may be performed by applying parallax distribution data obtained from the received LR images as they are, without generating the weighted parallax distribution.

6. Example of Configuration of Image Processing Apparatus

Subsequently, an example of configuration of an image processing apparatus executing the processing according to the embodiments explained above will be explained with reference to FIG. 28.

Figure 28:
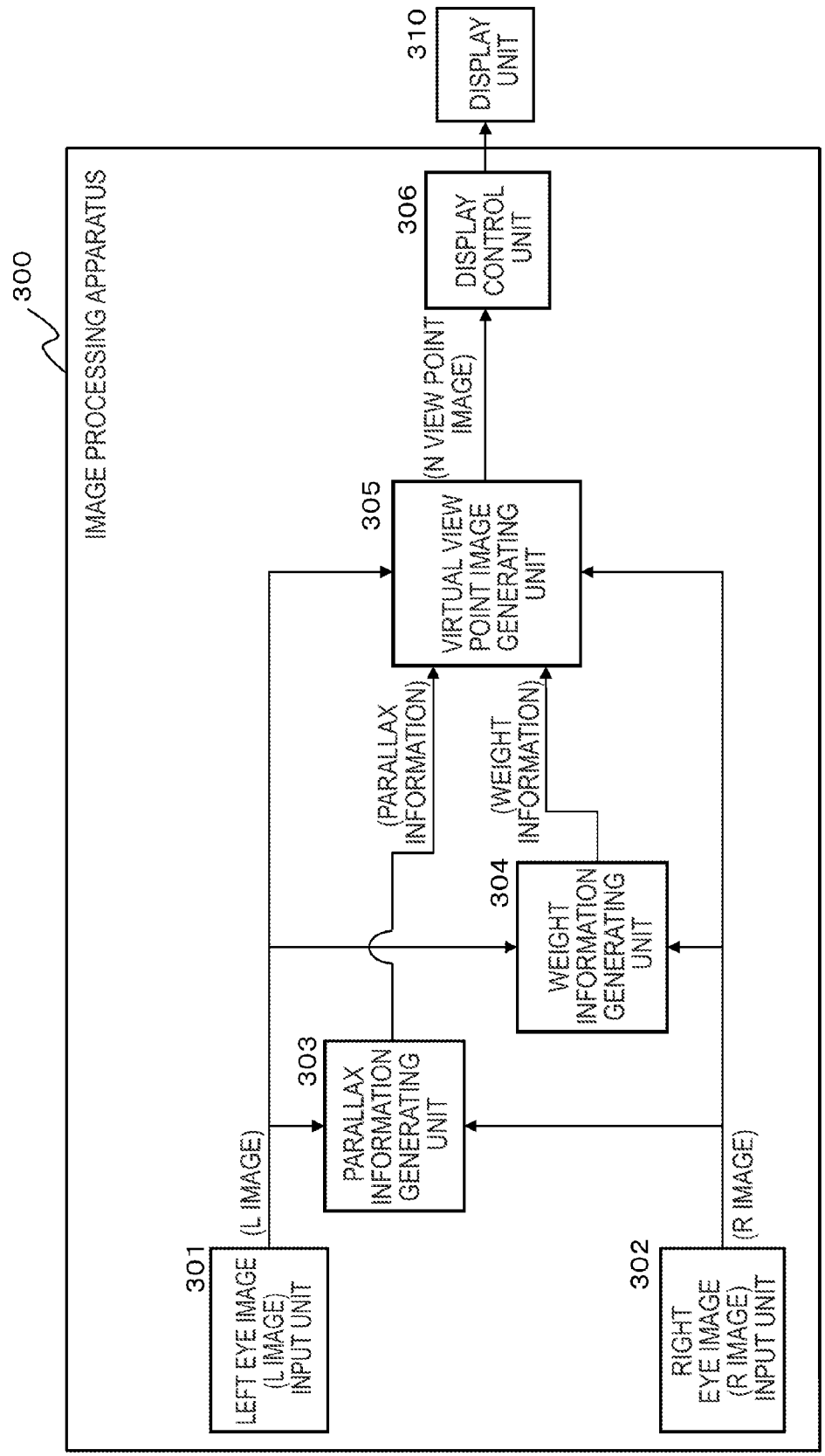
FIG. 28 is a figure for explaining an example of configuration of an image processing apparatus.

An image processing apparatus 300 as illustrated in FIG. 28 includes a left eye image (L image) input unit 301, a right eye image (R image) input unit 302, a parallax information generating unit 303, a weight information generating unit 304, a virtual view point image generating unit 305, a display control unit 306, and images generated by the image processing apparatus 300 is output to a display unit 310.

In the configuration as illustrated in FIG. 28, the display unit 310 is shown as an external configuration of the image processing apparatus 300. Alternatively, a configuration is also possible in which the display unit 310 is provided within the image processing apparatus 300.

The configuration as illustrated in FIG. 28 shows primary elements of the image processing apparatus 300, and the image processing apparatus 300 includes not only the elements as illustrated in the figure but also a control unit having a program execution function such as a CPU executing data processing control, a program executed by the control unit, a storage unit storing various kinds of parameters, and an input unit for inputting parameters, image data, and the like.

The left eye image (L image) input unit 301 and the right eye image (R image) input unit 302 inputs a left eye image (L image) and right eye image (R image) for three-dimensional (3D) image display generated in advance.

The parallax information generating unit 303 receives the left eye image (L image) and the right eye image (R image), and generates parallax information on the basis of these images.

As described above, the parallax information corresponds to a displacement between images of the same subject included in standard LR images (pixel displacement in a horizontal direction), and is information corresponding to a distance of a subject. More specifically, for example, data having parallax information (subject distance information) in units of pixels are generated.

As described above, the acquisition of the parallax information is executed according to, for example, an existing method as follows.

(a) block matching-based parallax information acquisition processing (b) DP (dynamic programming) matching-based parallax information acquisition processing (c) segmentation-based parallax information acquisition processing (d) learning-based parallax information acquisition processing (e) Parallax information acquisition processing of a combination of the above methods For example, the parallax information is obtained according to any one of the above methods (a) to (e).

The weight information generating unit 304 uses any one of the L image and the R image to generate weight information representing image weights in units of image regions. For example, the weight information is information in which larger weights are set in image regions that are likely to attract attention of an observer, which are, more specifically, a central portion of an image and a facial image region of a person.

More specifically, as explained with reference to FIGS. 15 to 17 above, (1) weight information where weights are set according to image regions (a larger weight is set in a central region)

(2) weight information weights are set according to subjects (a larger weight is set in a person region)

(3) weight information in which both of processing of (1) and (2) explained above are combined For example, it is such weight information.

The virtual view point image generating unit 305 generates virtual view point images by receiving the following information:

the L image from the left eye image (L image) input unit 301, the R image from the right eye image (R image) input unit 302, the parallax information from the parallax information generating unit 303, and the weight information from the weight information generating unit 304.

The virtual view point image generating unit 305 executes the determining processing of a virtual view point interval and the determining processing of the virtual view point positions in accordance with any one of the methods of the first to the fifth embodiments explained above, and generates virtual view point images corresponding to the determined virtual view point positions.

More specifically, for example, generating processing of the virtual view point images is executed according to processing of any one of the following items.

(1) generating processing of the virtual view point images corresponding to the virtual view point positions determined in view of the image quality (first embodiment)

(2) generating processing of the virtual view point images corresponding to the virtual view point positions determined on the basis of the appropriate amount of parallax and the image weights (second embodiment)

(3) generating processing of the virtual view point images corresponding to the virtual view point positions determined on the basis of the image quality, the appropriate amount of parallax, and the image weights (third embodiment)

(4) generating processing of the virtual view point images corresponding to the virtual view point positions of non-regular interval (fourth embodiment)

(5) generating processing of the virtual view point image using the shift processing (fifth embodiment)

The virtual view point image generating unit 305 generates multi-view point images of, e.g., N different view points, on the basis of the above processing, and outputs the multi-view point images to the display control unit 306.

The display control unit 306 generates display information according to the display unit 310 on the basis of the multi-view point images generated by the virtual view point image generating unit 305, and outputs the display information to the display unit 310.

As described above, the display image generated by the image processing apparatus according to an embodiment of the present disclosure is a display image of a naked eye 3D display apparatus, with which a user can view a stereoscopic image without wearing glasses.

The display unit 310 is a display unit for naked eye 3D display. The display unit 310 includes, for example, a lenticular sheet or a parallax barrier (parallax barrier) on a display surface, which can control images entering into the left eye and the right eye in accordance with a viewing/listening position.

For example, as explained with reference to FIG. 3 above, the display control unit 306 generates an image obtained by interleaving the images of the N view points generated by the virtual view point image generating unit 305, and outputs the image to the display unit 310.

It should be noted that the display control unit 306 generates display information in accordance with the display configuration of the display unit 310.

It should be noted that the image processing apparatus may also be configured as, for example, an image-capturing apparatus such as a camera having an image-capturing unit and a display apparatus such as a PC and a television set, and when it is configured as such apparatus, the image processing apparatus has a configuration having functions according to each apparatus.

For example, in a case of a camera, the image processing apparatus is configured to include an image-capturing unit for taking LR images as images from different view points and generate multi-view point images using the LR images received from the image-capturing unit.

7. Summary of Configuration of the Present Disclosure

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An image processing apparatus including:
a left eye image input unit configured to input a left eye image (L image) which is a left eye image signal applied to three-dimensional image display;
a right eye image input unit configured to input a right eye image (R image) which is a right eye image signal applied to three-dimensional image display;
a parallax information generating unit configured to generate parallax information from the left eye image (L image) and the right eye image (R image); and
a virtual view point image generating unit configured to receive the left eye image (L image), the right eye image (R image), and the parallax information, and generate virtual view point images including a view point image other than view points of the received LR images,
wherein the virtual view point image generating unit determines virtual view point positions by means of processing in view of at least one of image qualities of virtual view point images, an appropriate amount of parallax, or an image weight according to an image region, and generates the virtual view point images corresponding to the determined virtual view point positions.

(2) The image processing apparatus according to (1),
wherein the virtual view point image generating unit calculates an image quality evaluation value Q indicating an image quality of a virtual view point image, calculates a virtual view point interval G by applying the calculated image quality evaluation value Q, and determines the virtual view point position on the basis of the calculated virtual view point interval G.

(3) The image processing apparatus according to (2),
wherein the virtual view point image generating unit calculates the image quality evaluation value Q by applying information of at least one of reliability degree information of the parallax information or the generated virtual view point image information.

(4) The image processing apparatus according to any one of (1) to (3),
wherein the virtual view point image generating unit calculates, as an appropriate amount of parallax, a smaller value of a fusional parallax amount and a crosstalk allowable amount, calculates a virtual view point interval G by applying the calculated appropriate amount of parallax, and determines the virtual view point position on the basis of the calculated virtual view point interval G.

(5) The image processing apparatus according to any one of (1) to (4),
wherein the virtual view point image generating unit calculates, as an appropriate amount of parallax, a smaller value of a fusional parallax amount and a crosstalk allowable amount, calculates a virtual view point interval G by applying the calculated appropriate amount of parallax, and determines the virtual view point position on the basis of the calculated virtual view point interval G.

(6) The image processing apparatus according to any one of (1) to (5),
wherein the image processing apparatus includes a weight information generating unit configured to calculate image weight information according to an image region, and
wherein the virtual view point image generating unit calculates a weighted parallax distribution obtained by correcting the parallax information by applying the image weight information, calculates a virtual view point interval G by applying the appropriate amount of parallax and a maximum value of parallax calculated from the calculated weighted parallax distribution, and determines the virtual view point position on the basis of the calculated virtual view point interval G.

(7) The image processing apparatus according to any one of (1) to (6),
wherein the weight information generating unit generates image weight information in which a weight in unit of image region is set according to a position of an image or image weight information according to a subject included in an image.

(8) The image processing apparatus according to any one of (1) to (7),
wherein the virtual view point image generating unit determines a first virtual view point position by means of processing in view of at least one of an image quality of a virtual view point image, an appropriate amount of parallax, or an image weight according to an image region, determines a second virtual view point position of non-regular interval by means of non-linear mapping processing performed on the determined first virtual view point position, and generates a virtual view point image corresponding to the determined second virtual view point position of the non-regular interval.

(9) The image processing apparatus according to any one of (1) to (8),
wherein the virtual view point image generating unit determines the virtual view point position by means of processing in view of at least one of an image quality of the virtual view point image, an appropriate amount of parallax, or an image weight according to an image region, calculates an amount of parallel movement on the basis of parallax distribution data calculated from the parallax information, executes moving processing of the parallax distribution between the virtual view point images of the respective virtual view point positions on the basis of the calculated amount of parallel movement, and generates virtual view point images reflecting a moving processing result of the parallax distribution data.

Further, a method of processing executed by the above apparatus and the like and a program executing the processing are also included in the configuration of the present disclosure.

The series of processing explained in the specification can be executed by either hardware, software or a composite configuration of them both. When the processing is executed by software, a program having the processing sequence recorded therein can be installed and executed in a memory within a computer incorporated into dedicated hardware, or the program can be installed and executed in a general-purpose computer capable of executing various kinds of processing. For example, the program can be recorded to a recording medium in advance. The program can be installed to the computer from a recording medium. Alternatively, the program can be received via a network such as a LAN (Local Area Network) and the Internet, and the program can be installed to a recording medium such as an internal hard disk.

Various kinds of processing described in the specification are not limited to execution in time series as described therein. Alternatively, various kinds of processing can be executed in parallel or individually, in accordance with the performance of processing of the apparatus executing the processing or as necessary. In this specification, a system is a logical configuration of a set of multiple apparatuses, and an apparatus of each configuration is not necessarily limited to be provided within the same housing.

As described above, according to a configuration of an embodiment of the present disclosure, a configuration for generating multi-view point images based on LR images of three-dimensional images is achieved.

More specifically, for example, a virtual view point image generating unit is provided, wherein the virtual view point image generating unit receives a left eye image (L image) and a right eye image (R image) which are applied to three-dimensional image display, generates parallax information on the basis of the left eye image (L image) and the right eye image (R image), and uses the LR image and the parallax information to generate virtual view point images including view point images other than the view points of the received LR images. The virtual view point image generating unit determines the virtual view point positions by means of processing in view of at least one of an image quality of a virtual view point image, an appropriate amount of parallax determined in view of a fusional parallax amount and a crosstalk allowable amount, and an image weight according to an image region of a subject and the like and a position of an image, and generates virtual view point images corresponding to the determined virtual view point positions.

With such processing, optimum virtual view point images according to respective observation positions, i.e., high-quality virtual view point images of comfortable parallax ranges, can be generated.

The present disclosure contains subject matter related to that disclosed in Japanese Priority Patent Application JP 2011-173268 filed in the Japan Patent Office on Aug. 8, 2011, the entire content of which is hereby incorporated by reference.

What is claimed is:

1. An image processing apparatus comprising:
a left eye image input unit configured to input a left eye image (L image) which is a left eye image signal applied to three-dimensional image display;
a right eye image input unit configured to input a right eye image (R image) which is a right eye image signal applied to three-dimensional image display;
a parallax information generating unit configured to generate parallax information from the left eye image (L, image) and the right eye image (R image); and
a virtual view point image generating unit configured to receive the left eye image (L image), the right eye image (R image), and the parallax information, and generate virtual view point images including a view point image other than view points of the received LR images,
wherein the virtual view point image generating unit determines virtual view point positions by means of processing in view of at least one of image qualities of virtual view point images, an appropriate amount of parallax, or an image weight according to an image region, and generates the virtual view point images corresponding to the determined virtual view point positions,
wherein the virtual view point image generating unit determines a first virtual view point position by means of processing in view of at least one of an image quality of a virtual view point image, an appropriate amount of parallax, or an image weight according to an image region, determines a second virtual view point position of non-regular interval by means of non-linear mapping processing performed on the determined first virtual view point position, and generates a virtual view point image corresponding to the determined second virtual view point position of the non-regular interval, and
wherein the left eye image input unit, the right eye image input unit, the parallax information generating unit, and the virtual view point image generating unit are each implemented via at least one processor.

2. The image processing apparatus according to claim 1, wherein the virtual view point image generating unit calculates an image quality evaluation value Q indicating an image quality of a virtual view point image, calculates a virtual view point interval G by applying the calculated image quality evaluation value Q, and determines the virtual view point position on the basis of the calculated virtual view point interval G.

3. The image processing apparatus according to claim 2, wherein the virtual view point image generating unit calculates the image quality evaluation value Q by applying information of at least one of reliability degree information of the parallax information or the generated virtual view point image information.

4. The image processing apparatus according to claim 1, wherein the virtual view point image generating unit calculates, as an appropriate amount of parallax, a smaller value of a fusional parallax amount and a crosstalk allowable amount, calculates a virtual view point interval G by applying the calculated appropriate amount of parallax, and determines the virtual view point position on the basis of the calculated virtual view point interval G.

5. The image processing apparatus according to claim 1, wherein the image processing apparatus includes a weight information generating unit configured to calculate image weight information according to an image region, wherein the virtual view point image generating unit calculates a weighted parallax distribution obtained by correcting the parallax information by applying the image weight information, calculates a virtual view point interval G by applying the appropriate amount of parallax and a maximum value of parallax calculated from the calculated weighted parallax distribution, and determines the virtual view point position on the basis of the calculated virtual view point interval G, and
wherein the weight information generating unit is implemented via at least one processor.

6. The image processing apparatus according to claim 5, wherein the weight information generating unit generates image weight information in which a weight in unit of image region is set according to a position of an image or image weight information according to a subject included in an image.

7. The image processing apparatus according to claim 1, wherein the virtual view point image generating unit determines the virtual view point position by means of processing in view of at least one of an image quality of the virtual view point image, an appropriate amount of parallax, or an image weight according to an image region, calculates an amount of parallel movement on the basis of parallax distribution data calculated from the parallax information, executes moving processing of the parallax distribution between the virtual view point images of the respective virtual view point positions on the basis of the calculated amount of parallel movement, and generates virtual view point images reflecting a moving processing result of the parallax distribution data.

8. An image-capturing apparatus comprising:
an image-capturing unit configured to capture a left eye image (L image) which is a left eye image signal and a right eye image (R image) which is a right eye image signal, which are applied to three-dimensional image display;
a left eye image input unit configured to input, from the image-capturing unit, the left eye image (L image) which is the left eye image signal applied to the three-dimensional image display;
a right eye image input unit configured to input, from the image-capturing unit, the right eye image (R image) which is the right eye image signal applied to the three-dimensional image display;
a parallax information generating unit configured to generate parallax information from the left eye image (L image) and the right eye image (R image); and
a virtual view point image generating unit configured to receive the left eye image (L image), the right eye image (R image), and the parallax information, and generate virtual view point images including a view point image other than view points of the received LR images,
wherein the virtual view point image generating unit determines virtual view point positions by means of processing in view of at least one of image qualities of virtual view point images, an appropriate amount of parallax, or an image weight according to an image region, and generates the virtual view point images corresponding to the determined virtual view point positions,
wherein the virtual view point image generating unit determines a first virtual view point position by means of processing in view of at least one of an image quality of a virtual view point image, an appropriate amount of parallax, or an image weight according to an image region, determines a second virtual view point position of non-regular interval by means of non-linear mapping processing performed on the determined first virtual view point position, and generates a virtual view point image corresponding to the determined second virtual view point position of the non-regular interval, and
wherein the image capturing unit, the left eye image input unit, the right eye image input unit, the parallax information generating unit, and the virtual view point image generating unit are each implemented via at least one processor.

9. An image processing method with which an image processing apparatus generates multi-view point images, the image processing method comprising:
inputting, by a left eye image input unit, a left eye image (L image) which is a left eye image signal applied to three-dimensional image display;
inputting, by a right eye image input unit, a right eye image (R image) which is a right eye image signal applied to three-dimensional image display;
generating, by a parallax information generating unit, parallax information from the left eye image (L image) and the right eye image (R image); and
receiving, by a virtual view point image generating unit, the left eye image (L image), the right eye image (R image), and the parallax information, and generating virtual view point images including a view point image other than view points of the received LR images,
wherein, in the virtual view point image generating step, virtual view point positions are determined by means of processing in view of at least one of image qualities of virtual view point images, an appropriate amount of parallax, or an image weight according to an image region, and the virtual view point images corresponding to the determined virtual view point positions are generated,
wherein the virtual view point image generating unit determines a first virtual view point position by means of processing in view of at least one of an image quality of a virtual view point image, an appropriate amount of parallax, or an image weight according to an image region, determines a second virtual view point position of non-regular interval by means of non-linear mapping processing performed on the determined first virtual view point position, and generates a virtual view point image corresponding to the determined second virtual view point position of the non-regular interval, and
wherein the left eye image input unit, the right eye image input unit, the parallax information generating unit, and the virtual view point image generating unit are each implemented via at least one processor.

10. A non-transitory computer-readable medium having embodied thereon a program, which when executed by at least one processor of an image processing apparatus causes the image processing apparatus to execute a method of generating multi-view point images, the method comprising:
inputting a left eye image (L image) which is a left eye image signal applied to three-dimensional image display;
inputting a right eye image (R image) which is a right eye image signal applied to three-dimensional image display;
generating parallax information from the left eye image (L image) and the right eye image (R image); and
receiving the left eye image (L image), the right eye image (R image), and the parallax information, and generating virtual view point images including a view point image other than view points of the received LR images,
wherein, in generating the virtual view point images, virtual view point positions are determined by means of processing in view of at least one of image qualities of virtual view point images, an appropriate amount of parallax, or an image weight according to an image region, and the virtual view point images corresponding to the determined virtual view point positions are generated, and
wherein a first virtual view point position is determined by means of processing in view of at least one of an image quality of a virtual view point image, an appropriate amount of parallax, or an image weight according to an image region, a second virtual view point position of non-regular interval is determined by means of non-linear mapping processing performed on the determined first virtual view point position, and a virtual view point image corresponding to the determined second virtual view point position of the non-regular interval is generated.

* * * * *